(12) United States Patent
Stepuch et al.

(10) Patent No.: US 12,374,005 B2
(45) Date of Patent: Jul. 29, 2025

(54) GRAPHICS PROCESSING

(71) Applicant: Arm Limited, Cambridge (GB)

(72) Inventors: Rafal Stepuch, Cambridge (GB);
Frank Klaeboe Langtind, Trondheim (NO)

(73) Assignee: Arm Limited, Cambridge (GB)

( * ) Notice: Subject to any disclaimer, the term of this patent is extended or adjusted under 35 U.S.C. 154(b) by 241 days.

(21) Appl. No.: 18/185,447

(22) Filed: Mar. 17, 2023

(65) Prior Publication Data

US 2023/0306660 A1 Sep. 28, 2023

(30) Foreign Application Priority Data

Mar. 22, 2022 (GB) .................................. 2204008
Mar. 22, 2022 (GB) .................................. 2204012

(51) Int. Cl.
*G06T 11/40* (2006.01)
*G06F 9/38* (2018.01)
*G06T 1/20* (2006.01)
*G06T 1/60* (2006.01)
*G06T 11/20* (2006.01)

(52) U.S. Cl.
CPC .............. *G06T 11/20* (2013.01); *G06T 1/20* (2013.01); *G06T 1/60* (2013.01)

(58) Field of Classification Search
CPC ... G06T 11/20; G06T 1/20; G06T 1/60; G06T 11/40; G06T 15/005; G06T 2200/28; G06F 9/38
See application file for complete search history.

(56) References Cited

U.S. PATENT DOCUMENTS 8,619,085 B2 * 12/2013 Keall .................... G06T 15/005
345/441
8,704,836 B1 * 4/2014 Rhoades ................ G06T 11/40
345/553

(Continued)

FOREIGN PATENT DOCUMENTS

GB 2509822 A 7/2014
WO 2017200660 11/2017

OTHER PUBLICATIONS

Combined Search Report and Examination Report under Sections 17 and 18(3) dated Sep. 23, 2022, GB Patent Application No. GB2204008.3.

(Continued)

*Primary Examiner* — Xiao M Wu
*Assistant Examiner* — George Renze
(74) *Attorney, Agent, or Firm* — Pearl Cohen Zedek Latzer Baratz LLP

(57) ABSTRACT

The present disclosure relates to tile-based rendering systems. In particular there is provided a new primitive list format in which a sequence of commands generated for the primitive list includes a number of different respective types of commands including 'primitive' type commands storing primitive data, 'state' type commands storing state data and 'configuration' type commands for storing configuration data, wherein the primitive, state and configuration data can accordingly be stored separately in the primitive list, using the different respective types of commands. Also disclosed are techniques for encoding the data into the respective different types of commands.

20 Claims, 8 Drawing Sheets

(56) References Cited

U.S. PATENT DOCUMENTS

| | | |
|---|---|---|
| 10,068,307 B2* | 9/2018 | Vembu .................. G06T 1/60 |
| 12,039,645 B1* | 7/2024 | Bridon ................. G06T 11/40 |
| 2007/0146378 A1* | 6/2007 | Sorgard ............... G06F 18/22 |
| | | 345/581 |
| 2014/0347357 A1* | 11/2014 | Kim ..................... G06T 11/40 |
| | | 345/420 |
| 2015/0091892 A1* | 4/2015 | Kwon ................. G06T 15/005 |
| | | 345/419 |
| 2016/0098856 A1* | 4/2016 | Broadhurst ......... G06T 15/005 |
| | | 345/422 |
| 2020/0111247 A1 | 4/2020 | Heggelund et al. |
| 2021/0065422 A1 | 3/2021 | Croxford et al. |
| 2022/0051476 A1* | 2/2022 | Woop .................. G06F 9/5016 |

OTHER PUBLICATIONS

Combined Search Report and Examination Report under Sections 17 and 18(3) dated Sep. 23, 2022, GB Patent Application No. GB2204012.5.

Search Report dated Jul. 24, 2023, GB Patent Application No. GB2204012.5.

Search Report dated Apr. 30, 2025, GB Patent Application No. GB2416634.0.

* cited by examiner

| ID | Name | Type | Short description | Length (bits) |
|---|---|---|---|---|
| op_0 | prim8 | prim | Primitive command encoding vertex indices | 8 |
| op_1 | prim16 | prim | Primitive command encoding vertex indices | 16 |
| op_2 | ts8 | state | Short timestamp command (delta) with prim DVS select flag | 8 |
| op_3 | cvg8 | state | Tile coverage mask - compressed to 3 bits | 8 |
| op_4 | vrs8 | state | Internal/combined prim VRS rate | 8 |
| op_5 | pid8 | state | Short primitive ID (delta) | 8 |
| op_6 | sbid8 | state | Scissor index | 8 |
| op_7 | prim32 | prim | Primitive command encoding vertex indices | 32 |
| op_8 | pid32 | state | Full primitive ID value | 32 |
| op_9 | cfg0 | cfg0 | Configuration sequence 0 | 32+ |
| op_10 | cfg1 | cfg1 | Configuration sequence 1 | 32+ |

FIG. 4

GRAPHICS PROCESSING

CROSS-REFERENCE TO RELATED APPLICATIONS

This application claims priority pursuant to 35 U.S.C. 119(a) to British Application Nos. 2204008.3 and 2204012.5, both of which were filed on Mar. 22, 2022, which applications are incorporated herein by reference in their entireties.

BACKGROUND

The technology described herein relates to graphics processing systems, and in particular to methods and systems for use when processing graphics primitives in graphics processing systems in which a render output is sub-divided into a plurality of tiles for rendering (e.g. so-called "tile-based" graphics processing systems).

Graphics processing is normally carried out by first dividing the graphics processing (render) output to be rendered, such as a frame to be displayed, into a number of similar basic components of geometry to allow the graphics processing operations to be more easily carried out. These basic components of geometry may often be referred to graphics "primitives", and such "primitives" are usually in the form of simple polygons, such as triangles, points, lines, or groups thereof.

Each primitive (e.g. polygon) is at this stage defined by and represented as a set of vertices. Each vertex for a primitive has associated with it a set of data (such as position, colour, texture and other attributes data) representing the vertex. This "vertex data" is then used, e.g., when rasterising and rendering the primitive(s) to which the vertex relates in order to generate the desired render output of the graphics processing system.

For a given output, e.g. frame to be displayed, to be generated by the graphics processing system, there will typically be a set of vertices defined for the output in question. The primitives to be processed for the output will then be indicated as comprising given vertices in the set of vertices for the graphics processing output being generated. Typically, the overall output, e.g. frame to be generated, will be divided into smaller units of processing, referred to as "draw calls". Each draw call will have a respective set of vertices defined for it and respective primitives that use those vertices. For a given frame, there may, e.g., be of the order of a few thousand draw calls, and hundreds of thousands (or potentially millions) of primitives.

Once primitives and their vertices have been generated and defined, they can be processed by the graphics processing system, in order to generate the desired graphics processing output (render target), such as a frame for display. This basically involves determining which sampling points of an array of sampling points associated with the render output area to be processed are covered by a primitive, and then determining the appearance each sampling point should have (e.g. in terms of its colour, etc.) to represent the primitive at that sampling point. These processes are commonly referred to as rasterising and rendering, respectively. (The term "rasterisation" is sometimes used to mean both primitive conversion to sample positions and rendering. However, herein "rasterisation" will be used to refer to converting primitive data to sampling point addresses only.)

One form of graphics processing uses so-called "tile-based" rendering. In tile-based rendering, the two-dimensional render output (i.e. the output of the rendering process, such as an output frame to be displayed) is rendered as a plurality of smaller area regions, usually referred to as "rendering tiles". In such arrangements, the render output is typically divided (by area) into regularly-sized and shaped rendering tiles (they are usually rectangles, e.g. squares). (Other terms that are commonly used for "tiling" and "tile-based" rendering include "chunking" (the rendering tiles are referred to as "chunks") and "bucket" rendering. The terms "tile" and "tiling" will be used hereinafter for convenience, but it should be understood that these terms are intended to encompass all alternative and equivalent terms and techniques wherein the render output is rendered as a plurality of smaller area regions.)

In a tile-based graphics processing pipeline, the geometry (primitives) for the render output being generated is sorted into regions of the render output area, so as to allow the geometry (primitives) that need to be processed for a given region of the render output to be identified. This sorting allows primitives that need to be processed for a given region of the render output to be identified (so as to, e.g., avoid unnecessarily rendering primitives that are not actually present in a region). The sorting process produces lists of primitives to be rendered for different regions of the render output (referred to herein as "primitive" lists but also commonly referred to as "polygon" or "tile" lists).

Once the primitive lists have been prepared for all the render output regions, each rendering tile is processed, by rasterising and rendering the primitives listed for the region of the render output corresponding to the rendering tile.

The process of preparing primitive lists for regions of the render output thus basically involves determining the primitives that should be processed for a given render output region. This process is usually carried out by determining (at a desired level of accuracy) the primitives that intersect (i.e. that will appear (at least in part) within) the render output region in question, and then preparing a list of those primitives for future use by the graphics processing system. Thus, for each primitive to be processed, the graphics processor reads in the associated vertex data, converts the vertex positions at least to screen space (vertex shading), and then determines using the shaded vertex positions for each primitive which region(s) of the render output the primitive at least partially covers (and so should therefore be rendered for).

It should be noted here that where a primitive falls into more than one render output region, as will frequently be the case, it is included in a primitive list for each region that it falls within. A render output region for which a primitive list is prepared could be a single rendering tile, or a group of plural rendering tiles, etc.

In effect, each render output region can be considered to have a bin (the primitive list) into which any primitive that is found to fall within (i.e. intersect) the region is placed (and, indeed, the process of sorting the primitives on a region-by-region basis in this manner is commonly referred to as "binning").

The primitive lists prepared in this way can then be written out, e.g., to memory, and once a first processing pass including the tiling operation is complete, such that all of the primitive lists (for all of the primitives for all of render output regions) have been prepared, the primitive lists can then be used by the graphics processor, e.g. in a second (deferred) processing pass, to perform the actual rendering of the rendering tiles, with the information stored in the primitive list being used accordingly to identify the primitives to be rendered for each rendering tile when generating the desired render output, e.g. to display the frame.

As well as identifying respective primitives to be rendered for the associated render output regions, the primitive list may also include other data (e.g. primitive metadata) that is to be used when rendering the identified primitive to generate the desired render output (e.g. a frame for display).

The Applicants believe however that there remains scope for improvements in how data is arranged and stored in such primitives lists for use by tile-based rendering systems.

BRIEF DESCRIPTION OF THE DRAWINGS

Various embodiments will now be described by way of example only and with reference to the following figures, in which:

FIG. 4 shows a summary of commands that can be included into a primitive list having the primitive list format an embodiment of the technology described herein;

DETAILED DESCRIPTION

Figure 1:
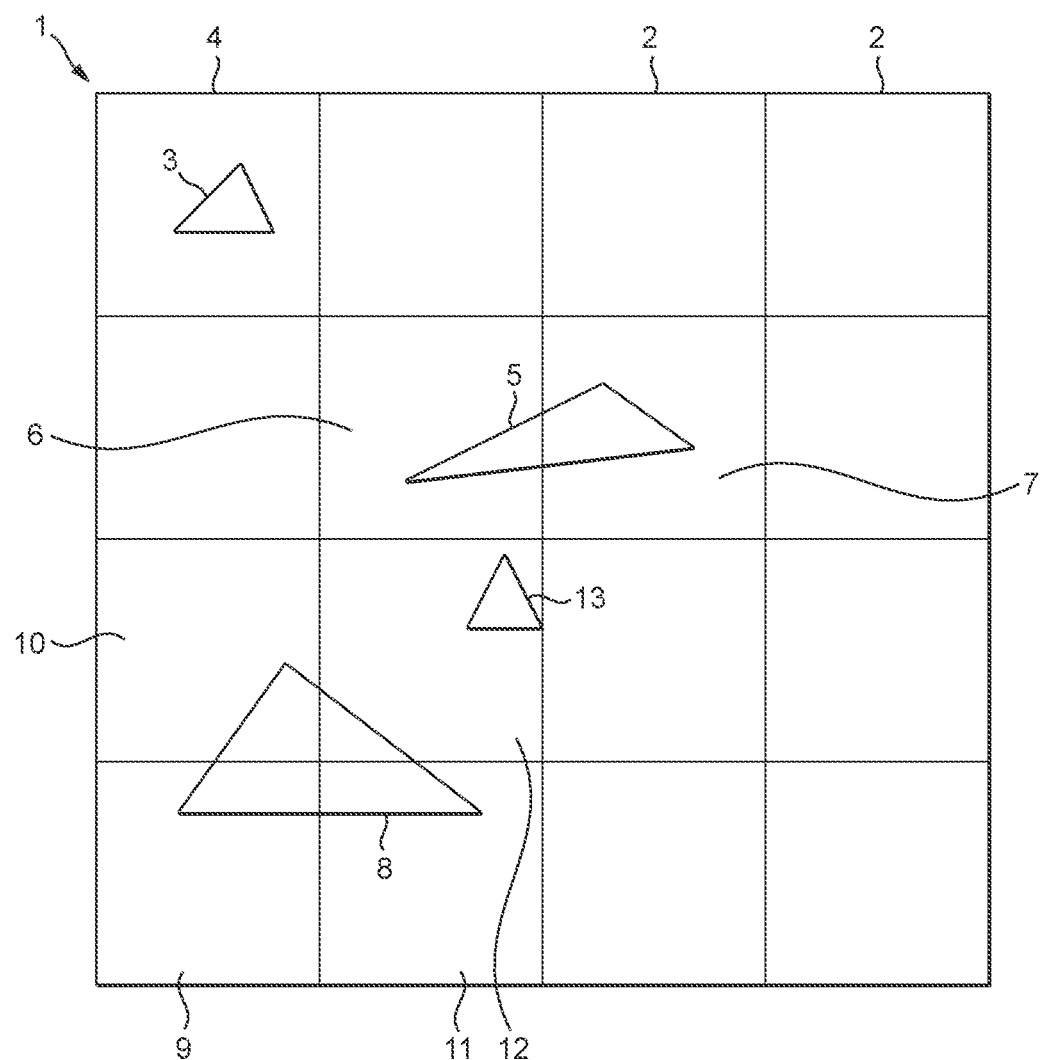
FIG. 1 shows schematically a tile-based graphics processing arrangement.

A first embodiment of the technology described herein comprises a method of processing data in a graphics processing system in which a render output is sub-divided into a plurality of tiles for rendering, the method comprising:
  determining which primitives in a sequence of primitives to be processed for the render output are to be rendered for respective regions into which the render output is sub-divided for sorting the primitives; and
  preparing corresponding primitive lists for the regions of the render output, each primitive list identifying a respective list of primitives that are to be rendered for the region of the render output to which the primitive list relates,
  wherein preparing a primitive list for a respective region of the render output comprises generating a sequence of commands for inclusion into the primitive list, the sequence of commands generated for the primitive list including a number of different respective types of commands including:
    (i) primitive type commands storing a first type of data ("primitive data") identifying individual primitives that are to be rendered for the region of the render output to which the primitive list relates;
    (ii) state type commands storing a second type of data ("state data") associated with processing operations to be performed when rendering individual primitives, wherein the second type of data may apply to sets of one or more primitives; and
    (iii) configuration type commands for storing a third type of data ("configuration data") that applies to groups of multiple sets of one or more primitives;
  the first, second and third types of data accordingly being stored separately in the primitive list, using the different respective types of commands.

A second embodiment of the technology described herein comprises a graphics processing system in which a render output is sub-divided into a plurality of tiles for rendering, the graphics processing system comprising:
  a tiling circuit that is operable to perform tiling operations to determine which primitives in a sequence of primitives to be processed for a render output are to be rendered for which respective regions into which the render output is sub-divided for sorting the primitives; and
  a primitive list preparation circuit that is configured to prepare corresponding primitive lists for respective regions of the render output, wherein each primitive list identifies a respective list of primitives that are to be rendered for the region of the render output to which the primitive list relates,
  wherein the primitive list preparation circuit, when preparing a primitive list for a respective region of the render output, is configured to: generate a sequence of commands for inclusion into the primitive list, the sequence of commands generated for the primitive list including a number of different respective types of commands including:
    (i) primitive type commands storing a first type of data ("primitive data") identifying individual primitives that are to be rendered for the region of the render output to which the primitive list relates;
    (ii) state type commands storing a second type of data ("state data") associated with processing operations to be performed when rendering individual primitives, wherein the second type of data may apply to sets of one or more primitives; and
    (iii) configuration type commands for storing a third type of data ("configuration data") that applies to groups of multiple sets of one or more primitives;
  the first, second and third types of data accordingly being stored separately in the primitive list, using the different respective types of commands.

The technology described herein relates to so-called "tile-based" graphics processing systems in which a render output (e.g. a frame for display) is sub-divided into a plurality of (smaller) regions ("tiles") for rendering, each region including a respective area of the render output. The respective regions (tiles) into which the render output is sub-divided for rendering can then be rendered separately, e.g. in parallel.

To facilitate this, the graphics processing system is configured, e.g. in a first processing pass, to perform a "tiling" operation that effectively sorts the geometry (which in the technology described herein is defined in terms of graphics 'primitives') that is defined for the render output into respective different regions of the render output into which the render output is sub-divided for the purpose of sorting the primitives. The tiling operation thus determines which primitives in a sequence of primitives that are to be processed for a render output need to be rendered for which of the regions into which the render output is sub-divided for the sorting (tiling) operation.

The result of this tiling operation is to generate a corresponding set of primitive lists (which are sometimes also referred to as "tile-lists", or polygon lists, but the term 'primitive lists' will primarily be used herein) that identify which of the primitives in the sequence of primitives defined for the render output are to be rendered for respective different regions of the render output. In this respect, it should be noted that a given primitive list may be prepared either for a single tile or for plural tiles of the render output. In other words, the regions into which the render output is divided for the tiling purpose may or may not directly correspond to the regions (i.e. "tiles") into which the render output is divided for rendering. Likewise, a given rendering tile may be associated with more than one primitive list (e.g. where the tiling operation is performed in a hierarchical manner), in which case multiple primitive lists may need to be suitably merged in order to determine which primitives are to be rendered for the region, and in which order. Various examples are possible in this regard, e.g. depending on how the render output is divided for processing.

(The graphics processor will then perform the actual rendering of the regions making up the overall render output in a second, "deferred" processing pass in which the primitives to be rendered for the different regions are identified using the respective primitive lists that were prepared in the first processing pass. Thus, once all of the primitive lists have been prepared, and the primitives sorted into the different regions of the render output accordingly, the primitive lists can then be read back into the graphics processor and used to perform the rendering of the respective rendering tiles to generate the render output.)

The first and second embodiments of the technology described herein particularly relate to how the data identifying and describing the primitives to be rendered is stored and arranged within the primitives lists, and provides a new and improved format for primitive lists, as will be explained further below.

In the primitive list format according to the first and second embodiments of the technology described herein, the data is encoded into the primitive list using respective different types of commands. Each command thus in an embodiment comprises a first portion comprising an operation code (opcode) identifying the type of command (the type of data that the command stores) and a second portion storing the data in question (the payload). A primitive list prepared according to the technology described herein will accordingly comprise a respective sequence of such commands for storing the data that is to be used when rendering the tile or tiles of the render output covered by the region of the render output for which the primitive list was prepared for.

When it is desired to render a particular rendering tile, the sequence of commands within the primitive list(s) for that tile can thus be (and is) read and processed (e.g. decoded) appropriately, e.g. by a primitive list reading circuit executed on the graphics processor, in order to identify the primitives that need to be rendered, as well as to identify any other state or configuration data included in the primitive list that may be needed to determine the processing operations or parameters that should be used when rendering the identified primitives.

According to the first and second embodiments of the technology described herein, there are at least three identifiably different types of commands, for respectively storing three different types of data, that can be included into the sequence of commands for a primitive list, as will be explained further below.

The different types of commands can be grouped as follows: (i) primitive type commands storing a first type of data ("primitive data") identifying individual primitives that are to be rendered for the region of the render output to which the primitive list relates; (ii) state type commands storing a second type of data ("state data") associated with processing operations to be performed when rendering individual primitives, wherein the second type of data may apply to sets of one or more primitives; and (iii) configuration type commands for storing a third type of data ("configuration data") that applies to groups of multiple sets of one or more primitives.

Therefore, the different types of commands store respective different types of data and accordingly may, e.g., and in an embodiment do, differ in terms of how frequently they are included into a primitive list.

For instance, the first type of commands that can be included within a primitive list prepared according to the novel primitive list format of the technology described herein are 'primitive type' commands, i.e. commands for storing (primitive) data identifying the individual primitives that are to be rendered for the region of the render output to which the primitive list relates. These primitive type commands identify individual primitives, e.g., and in an embodiment, such that there is a one-to-one correspondence between primitives and their respective primitive commands. Thus, whenever it is determined that a primitive (i.e. the current primitive being processed for a tiling operation) should be rendered for a region (or regions) of the render output, a corresponding primitive command storing the data identifying the primitive in question is in an embodiment generated for inclusion into a respective primitive list for that region (or regions).

A primitive list prepared in accordance with the first and second embodiments of the technology described herein will therefore include a number of primitive commands storing primitive data identifying the individual primitives, e.g. by reference to their associated vertex indices, that are to be rendered for the region of the render output to which the primitive list relates. This type of data is therefore necessarily stored on a per-primitive basis.

In addition to the primitive type commands that store the data identifying the individual primitives themselves, a primitive list according to the format of the technology described herein can (and does) include further types of commands for storing other data (or metadata) describing the primitives, such as state and/or configuration data identifying processing operations or parameters that are to be used when rendering the primitives (broadly, primitive metadata). These types of data generally describe the primitives, or groups of primitives, and so such data is in an embodiment stored in association with the respective primitive(s) to which it applies.

The technology described herein recognises, however, that the different types of data (e.g. the primitive data, state data and configuration data) that may need to be stored in the primitive lists according to the technology described herein typically have different associated lifetimes within the rendering process. The technology described herein further recognises that the different types of data can thus advantageously be grouped on this basis (into first, second and third types of data, as discussed above), and that it may be better to store these different types of data separately within the primitive list (e.g. rather than packeting a primitive and its associated state (or meta) data together into a single command).

This can then allow for improved, e.g. more efficient, storing of such data in the primitive lists, with greater flexibility in how, and when, each different type of data is stored in the primitive lists, as will be explained further below.

For instance, in addition to the first type of commands (the primitive type commands) identifying the individual primitives, a primitive list according to the technology described herein can (and does) also include a number of commands of a second type, namely "state" type commands, storing respective state data for the primitives that are included in the primitive list.

The primitive state data that is stored by such state type commands may apply to individual primitives, and so may need to be stored on a per-primitive basis. However, the state data may also apply to sets of plural primitives. In other words, a given piece of state data may in some cases apply to a single primitive, but often the same state data may be shared between a set of one or more primitives, such that the state data only optionally varies on a per-primitive basis.

Using dedicated state type commands for storing such state data that may apply to sets of one or more primitives means that the storing of the state data is then decoupled from the storing of the primitive data (e.g. compared to packeting the state data and primitive data together into a single command). State type commands can therefore be selectively included (or not) at the appropriate positions within the sequence of commands for the primitive list, such that state type commands only need to be included (and thus are only included) when there has been a change in state that needs to be encoded into the primitive list.

This can therefore facilitate an improved, e.g. more flexible and efficient (smaller), arrangement of the overall primitive list, as the state data only needs to be explicitly encoded when there has been a change, such that the number and/or size of commands in the primitive list command sequence can accordingly be reduced (thus reducing the overall size of the primitive list, in turn reducing bandwidth/storage requirements for storing the primitive lists in memory).

For example, a state type command may be included in the sequence of commands for a primitive list before (e.g., and in an embodiment, immediately before) the start of a set of one or more primitive commands identifying the primitives to which the state data indicated by the command applies. Thus, if the state data is constant for a set of plural primitives, or at least changes in a predictable (and expected) way, there is no need to store (the same) state data for each of the primitives (primitive commands) in the set of primitives, and in the technology described herein this is therefore not done. Instead, a sequence of one or more dedicated state type commands is included into the sequence of commands which sequence of state type commands applies to the following set of one or more primitives as a whole.

Thus, when a new primitive is to be included into a primitive list, a primitive type command for the primitive is then generated for inclusion into the sequence of commands for the primitive list. At the same time, a set of one or more state type commands may be generated for storing any state data that applies to that primitive. The set of state type commands can then be included into the primitive list in association with the primitive command to which it relates, e.g., and in an embodiment, immediately before the primitive command in the sequence of commands for the primitive list. The next primitive is then identified and a suitable primitive command for that primitive generated for inclusion. If the state data has changed between the two primitives, a further state type command (or set of state type commands) is in an embodiment also included in association with the next primitive command (and so on). On the other hand, if the state data for the new primitives has not changed relative to the previous value (or, relative to some default value, depending on how the state data is represented), there is no need to add another state type command (and this is therefore not done).

This also then allows a more efficient encoding of such state type information that may or may not be required in a primitive list. For example, if a certain feature or mode (e.g. a variable rate shading mode) is disabled, there is in that case no need to include any data relating to that mode into the primitive list, and the technology described herein facilitates this. In contrast, when such state data is not stored separately to the primitive data, for example, it is difficult to selectively enable/disable the storing of such mode-specific data, even when the mode is not being used.

The primitive lists according to the technology described herein can (and do) also include a third type of command, namely a "configuration" type command, for respectively storing configuration data that applies to groups of plural sets of primitives. For example, a set of configuration data may typically apply to an entire draw call of primitives, or even to multiple draw calls, e.g. an entire frame that is to be rendered. Again, therefore, according to the technology described herein, the configuration data can be included separately to the primitive and state data, using dedicated configuration commands.

A sequence of commands for a primitive list according to the technology described herein may therefore, e.g., and in an embodiment does, start with one or more configuration type commands that apply to multiple (e.g. all of the) primitives in a sequence of primitives (e.g. a draw call) to be rendered. The configuration sequence is in an embodiment then followed by a sequence of primitive type commands identifying the primitives to be rendered from the sequence of primitives to which the configuration data relates, and associated state type commands storing any associated state data that is to be used when rendering the primitives, as and when an explicit change in state is required to be encoded.

The technology described herein thus provides a new and improved primitive list format in which the different types of data identified above are stored using respective different types of commands.

The effect of all this is then to provide a more flexible and efficient approach for encoding the various different types of information that need to be stored in the primitive list.

For instance, as mentioned above, the different types of commands may, e.g., and in an embodiment do, differ in terms of how frequently they are required to be included into a primitive list. This allows savings in particular in relation to the state type data which can according to the first and second embodiments of the technology described herein then be selectively included (or not) into the primitive list in association with a primitive, depending on whether a change in state data needs to be encoded for that primitive (e.g. such that where the state data is carried over from the previous primitive in the list, or is a default value, a state command does not need to be included to explicitly indicate this).

The different types of commands may, e.g., and in an embodiment do, also differ in terms of the size of the commands, and how the respective data is stored in the different types of commands. The sizes of the different types of commands, and the respective encoding that is used for the respective data stored in the commands, may thus be selected and optimised based on the type of data that is to be stored (with the effect of this therefore being that different types of encoding are in an embodiment used for the different types of data having the different lifetimes).

In other words, the new primitive list format described above not only allows for more efficient arrangements for encoding data within the overall primitive list, but can also allow for more efficient arrangements for encoding data within the individual commands within the primitive list (since the commands are dedicated for particular types of data, and the encoding can therefore be optimised accordingly). That is, a further benefit of the approach according to the technology described herein is that different encoding techniques can then be used for storing data of the respective different types, e.g., and in an embodiment, to provide an overall more efficient or optimised storage of the different types of data in the primitive list.

For instance, primitive data will always need to be stored in the primitive lists, but by storing this primitive data separately from the associated state data (which state data may vary on a per-primitive basis but may also be shared between sets of one or more primitives, such that state data may not be required to be stored for each and every primitive), using respective different types of commands, it may be possible to more efficiently encode the primitive data into the primitive commands, e.g. since all of the data in a primitive command is of the same basic type.

Correspondingly, the state and configuration data is also stored separately, in dedicated respective state and configuration type commands, and can therefore encoded in a different manner, more suited to those types of data.

That is, by storing the different types of data separately, using different types of commands, the use and form of the commands can be better optimised for the respective types of data to which they apply. Thus, the technology described herein in an embodiment facilitates the use of smaller size commands. In that regard, in embodiments, the technology described herein tries to use smaller commands in particular for storing data that is (expected to be) more frequently encoded into a primitive list. For example, the operation codes (opcodes) assigned to the different types of commands may be allocated such that the commands that are expected to be most frequently included have relatively smaller operation codes (opcodes), whereas the less frequent (e.g. configuration type) commands are allocated relatively larger operation codes (opcodes). Various other optimisations may be performed in this regard.

Various embodiments for optimising the encoding of the different types of data will now be described. It will be appreciated that these optimisations may be used alone, or in any combination. That is, a benefit of the technology described herein is the possibility to use different encoding techniques for the different types of data, independently of how the specific encoding is performed for any particular one or more of the different types of data. However, in embodiments, these optimisation are all used together, to provide an overall more (most) efficient encoding of the different types of data into the primitive list.

Starting with the primitive data, as mentioned above there is typically a one-to-one correspondence between primitives and primitive commands (although it may be possible to group primitives together into a single command so long as it is known that the primitives will share the same state and configuration data). This means that primitive type commands will generally be included into the primitive lists more frequently than other types of commands, e.g., and in an embodiment, on a per-primitive basis.

Each primitive command in an embodiment comprises a first portion representing an operation code (opcode) identifying that the command is a primitive type command. Each primitive command in an embodiment further comprises a second portion that stores the data identifying the primitive in question.

The data identifying the primitive can be stored in the second portion of the command in any suitable and desired way. In an embodiment the data that is stored in the second portion of the primitive command identifies a set of vertex indices defining the primitive in question. For example, a triangular primitive will have three vertex indices that define the vertices of the triangle, and it is in an embodiment these vertex indices that are stored in the primitive type commands in order to identify the primitive. It is noted here that other primitive arrangements are possible (such as primitive fans, strips, etc.) that have more than three vertices, in which case more than three vertex indices should be stored. Likewise, there may be other primitive types (e.g. points, lines) having fewer than three vertices, in which case fewer than three vertex indices may be stored. In addition to the vertex indices, there may be various other data such as a point size (for a point or line primitive), a winding order (where this is not predetermined), etc., that may need to be stored for a primitive, e.g. depending on the type of primitive being encoded. Any such data may be stored appropriately in the primitive commands.

In an embodiment, the primitive data (the primitive vertex indices) is stored in a compressed form, to facilitate the use of smaller size commands, and hence reduce the overall storage/bandwidth requirements for storing the primitive lists including such commands. For example, in embodiments, rather than storing the vertex indices for a primitive in full, the vertex indices are instead encoded and stored as difference (delta) values, e.g. compared to another vertex index.

In an embodiment, this difference (delta) encoding is performed relative to the previous primitive in the primitive list. Thus, so long as there is a previous primitive in the primitive list, the first vertex to be stored for a (the current) primitive is in an embodiment stored (encoded) as a difference (delta) to a (e.g., and in an embodiment, the first) vertex index for the primitive from the previous primitive command in the primitive list.

Thus, in embodiments, so long as there is a previous primitive command in the sequence of commands defining the sequence of primitives for the primitive list, the first vertex index for the current primitive is stored as a difference (delta) to a vertex index, e.g., and in an embodiment, the first vertex index, for the primitive indicated by the previous primitive command in the sequence (which in turn will be stored as a different to the first vertex index in the command before that, and so on). (If the current primitive is the first in a sequence of primitives, such that there is no previous primitive, the first vertex index may in that case need to be stored in full (e.g. the previous primitive vertex index may be set to zero as default), but then after the first primitive has been identified and included in the primitive list, the vertex indices for subsequent primitives are in an embodiment stored as differences (deltas), as explained above.)

During the subsequent reading/decoding of the primitive list, the primitive commands in the technology described herein therefore in an embodiment take as input the (first) vertex index for the previous primitive command in the sequence. Thus, when a primitive command is decoded, the (difference (delta)) value for the (first) vertex index is in an embodiment output for use when decoding the next primitive command, and so on.

The other vertices within a primitive command are in an embodiment then stored as differences (deltas) relative to the first vertex index within the (same) primitive command.

Thus, the second portion of the primitive command in an embodiment comprises a number of bits for storing the vertex indices differences (deltas) in the manner described above. In an embodiment these bits are arranged and stored in respective fields of the second portion, with each field in the second portion dedicated for storing a respective vertex index difference (delta).

For example, a first set of bits (a first field) may be used to store the first vertex index (difference (delta)), a second set of bits (field) used to store the second vertex index (difference (delta)), a third set of bits (field) used to store the third vertex index (difference (delta)), etc. Typically the differences between different primitives are expected to be larger than the differences between the vertices within the same primitive, and so the first field (the first set of bits that are used for storing the first vertex index relative to the previous primitive) may, e.g., and in an embodiment does, include a greater number of bits than the second and third fields. Other arrangements would however be possible.

In an embodiment, when storing (encoding) the first vertex index in a primitive command (that is in an embodiment encoded relative to a previous primitive in the sequence of primitives, as described above), rather than storing the vertex index difference (delta) value in its 'raw' form, a negative offset is in an embodiment applied to the vertex index difference (delta) value to reduce the value, and the reduced value is then stored using the appropriate bits in the second portion of the primitive command.

In that respect, the technology described herein further recognises that the primitive index values in a sequence of primitives to be processed (e.g. a draw call) will typically increase (or the primitives can at least be arranged such that this is the case). Thus, the vertex index differences (deltas) between primitives can generally be expected to be positive (more often than they are negative). The technology described herein recognises that it may therefore be better to be able to store more positive values with the available bits, e.g. rather than storing a more equal (symmetric) range of negative and positive values.

For instance, where there are, e.g., 3-bits available to encode a vertex index difference (delta), with the vertex index difference (delta) values being stored using two's complement representation, the full range of values that can be stored using those bits would be: {−4, −3, −2, −1, 0, 1, 2, 3). By using a negative offset, the range of values that can be stored can effectively be shifted. For example, by applying a negative offset of −2 to the first vertex index difference (delta) value, the range of vertex index difference (delta) values that can be stored with the available bits is effectively shifted to: {−2, −1, 0, 1, 2, 3, 4, 5}. The use of such negative offset therefore then allows more (a greater range of) positive difference (delta) values to be encoded using the same number of bits. The benefit of this is that, as mentioned above, the vertex index values will tend to increase from primitive to primitive, such that the vertex index differences (deltas) will more often than not be positive, such that increasing the range of positive values that can be stored may be beneficial.

As mentioned above, the second and third (and further, if present) vertex indices are in an embodiment stored as differences (deltas) to the first index in the (same) primitive command. It will be appreciated that, at least for triangle primitives, the further indices for a given primitive should not have a difference value of zero compared to the first index for the primitive (e.g. since that would define a triangle of zero area, which could therefore be culled).

Thus, when storing such further vertex index differences (deltas) relative to the first index in a primitive command it is often not necessary to be able to encode the zero value, and in embodiments this is therefore not done. Instead, the bit value that would be used to encode zero are used to extend the range of positive (non-zero) values that can be stored. This can be implemented, e.g., by selectively applying a negative offset of −1 to the vertex index difference (delta) when the difference (delta) is positive (but not applying an offset when the difference (delta) is negative). In this way, by not encoding the zero value, this then frees up an additional value, such that the range of (non-zero) positive values that can be stored is effectively extended by one.

Thus, in embodiments, when storing the first vertex index difference (delta) value for a (the current) primitive, which difference (delta) is stored relative to the previous primitive in the primitive list, a negative offset is applied to reduce the difference (delta) value (to make it less positive), and the reduced value is then stored. When the primitive command is decoded, the offset can then be reversed accordingly, to recover the actual value. This then effectively extends the range of positive values that can be stored using the available bits.

Correspondingly, in embodiments, when storing the second or third (or further) vertex index difference (delta) values for a (the current) primitive, an offset of negative one is in an embodiment applied when the difference (delta) value is positive, whereas zero offset is applied when the difference (delta) value is negative. During the decoding, when the stored value is zero, or positive, the offset can thus be reversed (by adding one). Otherwise, if the stored value is negative, that value is used. This then has the effect of not storing a zero difference (delta) value, again increasing the range of positive values that can be stored using the available bits.

The effect of all this is therefore to allow for a more efficient encoding of the primitive vertex indices into the primitive commands, in particular to increase the maximum (positive) index difference (delta) value that can be stored using the available bits (or, conversely to reduce the number of bits required to store the vertex indices).

In this respect, it will be appreciated that the primitive type commands could all have a fixed-size, e.g. 32-bits.

However, in embodiments, the primitive list format of the technology described herein uses a plurality of different primitive type commands having different sizes (different numbers of available bits for storing the primitive vertex indices).

For example, in an embodiment, there may be at least a first primitive type command having a first size (e.g. 8-bits), a second primitive type command having a second size (e.g. 16-bits), and a third primitive type command having a third size (e.g. 32-bits).

Thus, in embodiments, there is a set of primitive type commands of different sizes that are available for storing primitive data. These different (sub-) types of primitive command are in an embodiment identified appropriately using different respective operation codes (opcodes) (stored in the first portion of the command).

In an embodiment these primitive type commands can also be used in select combinations, e.g. in order to store larger differences (deltas), if required. In that case, (at least some of) the primitive commands in an embodiment further include a bit value that indicates that the primitive command continues into the next primitive command, such that the next primitive command also stores data for the same primitive (e.g. as opposed to being a new primitive command storing primitive data for the next primitive in the sequence of primitives).

When a primitive is to be encoded into the primitive list, the most appropriately sized primitive type command, or combination of two or more primitive type commands, can therefore be selected, e.g. to best match the size of the primitive data (the primitive vertex index differences (deltas)) that is to be stored.

That is, rather than using a single type of fixed-size primitive command to store any and all primitive data, the technology described herein in an embodiment allows a selection of one or more primitive type commands from a set of primitive commands that are available to be used for storing primitive data for a respective primitive. This then facilitates a more efficient, variable length encoding of the primitive data, wherein the size of the primitive commands can be selected more appropriately based on the size of the primitive data (e.g. the vertex index differences) that needs to be stored for a particular primitive.

Thus, embodiments of the technology described herein allow the primitive data to be stored in commands of variable length, thus providing a more efficient/optimised arrangement for storing the primitive vertex index differences (deltas) (e.g. compared to using fixed-size commands which may be too big (or little) to store the primitive vertex index differences (deltas) for a particular primitive), and in an embodiment reducing memory storage/bandwidth requirements.

Thus, in embodiments, there are a plurality of available primitive type commands having different sizes. When an individual primitive is to be included into the primitive list, a corresponding set of one or more primitive commands selected from the plurality of available primitive type commands is generated for storing the data identifying the primitive. In an embodiment, the selection of the set of one or more primitive commands that is used for storing the data identifying the primitive is based on the size of the data that is to be stored, in an embodiment such that the 'smallest' available primitive command or combination of primitive commands is used for storing the data identifying the primitive (i.e. the set of one or more primitive commands that uses the fewest number of bits for storing the primitive data).

In an embodiment, there is a limited set of primitive type commands (e.g. three different types of primitive commands). In an embodiment, the possible combinations of these primitive type commands is also restricted. This helps to simplify the decoding logic. Thus, in embodiments, a combination of two or more primitive type commands may be used to store data identifying a single primitive, wherein the available combinations of different primitive type commands that can be used to store data identifying a single primitive is restricted to a subset of all of the possible combinations of primitive type commands.

For example, in an embodiment, up to (but no more than) four primitive commands can be used in combination to store data for a single primitive. The primitive commands that can be validly combined can be the same or different types of primitive command. Various examples are possible in this regard. In general, the valid combinations should be selected to allow a suitably wide range of different sizes of primitive data to be stored using a reasonable number of combinations, to avoid over complicating the decoder logic.

It is believed that encoding primitive data into a primitive list in this way may be novel and advantageous in its own right.

Thus, a further embodiment of the technology described herein comprises a method of processing data in a graphics processing system in which a render output is sub-divided into a plurality of tiles for rendering, the method comprising: determining which primitives in a sequence of primitives to be processed for the render output are to be rendered for respective regions into which the render output is sub-divided for sorting the primitives; and preparing corresponding primitive lists for respective regions of the render output, each primitive list identifying a respective list of primitives that are to be rendered for the region of the render output to which the primitive list relates, wherein preparing a primitive list for a respective region of the render output comprises generating a sequence of primitive commands storing data identifying individual primitives that are to be rendered for the region of the render output to which the primitive list relates, wherein there are a plurality of different primitive type commands available for storing the data identifying a primitive, the different primitive type commands having different respective sizes, and wherein when a new primitive is to be included into the primitive list, a corresponding set of one or more primitive commands selected from the plurality of available primitive type commands is generated for storing the data identifying the primitive.

Another embodiment of the technology described herein comprises a graphics processing system in which a render output is sub-divided into a plurality of tiles for rendering, the graphics processing system comprising: a tiling circuit that is operable to perform tiling operations comprising determining which primitives in a sequence of primitives to be processed for a render output are to be rendered for respective regions into which the render output is sub-divided for sorting the primitives; and a primitive list preparation circuit that is configured to prepare corresponding primitive lists for respective regions of the render output, each primitive list identifying a respective list of primitives that are to be rendered for the region of the render output to which the primitive list relates, wherein preparing a primitive list for a respective region of the render output comprises the primitive list preparation circuit generating a sequence of primitive commands storing data identifying individual primitives that are to be rendered for the region of the render output to which the primitive list relates, wherein there are a plurality of different primitive type commands available for storing the data identifying a primitive, the different primitive type commands having different respective sizes, and wherein when a new primitive is to be included into the primitive list, a corresponding set of one or more primitive commands selected from the plurality of available primitive type commands is generated for storing the data identifying the primitive.

As will be appreciated by those skilled in the art, these embodiments of the technology described herein can, and in an embodiment do, comprise any one or more or all of the features of the technology described herein, as appropriate.

In particular, the data identifying the primitive is in an embodiment stored in the selected primitive command (or set of primitive commands) in a compressed form, in an embodiment as described above.

Thus, in embodiments, the different primitive type commands each comprise a first portion storing an operation code identifying that the command relates to primitive data and a second portion storing data identifying a set of vertex indices for the primitive to which the primitive command relates, with the second portions being able to store different amounts of data, and wherein the vertex indices are stored in the second portion in a compressed form.

Moreover, the first vertex index for the primitive to which the current primitive command relates is in an embodiment stored as a difference to the first vertex index for the primitive identified by the previous primitive command in the primitive list, and in an embodiment a negative offset is applied to the difference value for the first vertex index to reduce the difference value, with the reduced value for the first vertex index stored in the second portion of the primitive command.

Further, the second or further vertex indices for the primitive to which the current primitive command relates are in an embodiment stored as differences to the first vertex index for the current primitive, and in an embodiment when storing the second or further index differences, a negative offset is selectively applied, such that when the difference value is positive, a negative offset of one is applied, whereas when the difference value is negative, zero offset is applied.

Thus, the compression that is used for the primitive data (the vertex indices) is in an embodiment the same compression described above. In that respect, it will be appreciated that the use of an offset to increase the range of positive values that can be encoded without increasing the number of bits, is particularly advantageous in the case where there are a plurality of different sizes of primitive type commands that are available for storing such data, since in that case, reducing the number of bits required to store the data identifying the primitive may enable the use of a smaller size command. (In contrast, when using larger fixed-size commands for all of the primitive data, reducing the number of bits may be less significant, since any saved bits may anyway need to be padded out in order to fill the command.)

Thus, in an embodiment, the set of one or more primitive commands from the plurality of available primitive type commands that is generated for the primitive being selected based on the size of the data that is to be stored for identifying the primitive, in particular such that the data identifying the primitive is stored using the 'smallest' available set of one or more primitive commands from the plurality of available primitive type commands (i.e. the set of one or more primitive commands that uses the fewest number of bits for storing the primitive data).

Likewise, in embodiments of these embodiments of the technology described herein, the primitive list in an embodiment also includes separate state and configuration type commands, such that any required state data and configuration data is in an embodiment stored separately to the primitive data, e.g. as described above in relation to the first and second embodiments of the technology described herein.

The discussion above explains an example format for the primitive type commands. In addition to the primitive type commands (identifying the actual primitives to be rendered, e.g. in terms of their primitive vertex indices, e.g. as described above), the primitive list format in the technology described herein may also comprise one or more state data type commands for storing attributes and other such data describing the primitives and the processing operations and parameters that should be used when rendering the primitives.

Some examples of the type of state data that is stored in this way may include any one or more of: (i) a timestamp (indicating a value of a timestamp for a primitive); (ii) a tile coverage mask (indicating the primitive tile coverage, i.e. whether or not the primitive covers all four quadrants of a tile); (iii) a variable shading rate (indicating a rate of shading that is to be used when rendering (shading) the primitive, when variable rate shading is enabled); (iv) a scissor index (indicating whether and/or how a scissoring operation is to be performed); and (v) a primitive identifier value (indicating the primitive identifier).

However, various other examples of state (or meta) data that may be stored in this way may be possible depending on the configuration of the graphics processing system.

This second type of data (state data) is generally associated with (and so should be stored in association with) respective primitives. This second type of data may thus vary on a per-primitive basis, and respective state type commands could therefore be included in association with each and every primitive command. However, as mentioned above, the technology described herein recognises that this second type of data may also be shared between sets of plural primitives, such that it only optionally varies per-primitive (in contrast to the primitive data itself, which necessarily varies per-primitive).

For example, this may be the case for (e.g.) a variable shading rate and/or scissor index command, where such operations are enabled, as the shading rate and/or scissoring operations to be performed may be the same for a set of plural primitives in a sequence of primitives. In the technology described herein, only one state command indicating the variable shading rate and/or scissoring operations to be performed may therefore need to be included in respect of the set of plural primitives.

As another example, the state data may vary in a predictable (and expected) manner between primitives, such that it is not required to be encoded per-primitive. For instance, this may be the case for (e.g.) the primitive identifier value which may be incremented by one by default, such that a state type command indicating a primitive identifier value may only be required if there is a larger jump in primitive identifier value between two primitives.

Thus, this second type of data (the state data) in general applies to sets of one or more primitives. In the primitive list format of the technology described herein, dedicated state data commands are used for storing such state type data. In an embodiment, each type of state data that may desirably be included into a primitive list has its own respective state type command. Thus, each of the state type commands in an embodiment includes a first portion including an operation code (opcode) identifying which type of state data the command stores, and a second portion storing the actual state data (i.e. the payload).

Thus, there may be separate state type commands for storing, in respect of a set of one or more primitives any one or more of: (i) timestamp data; (ii) a tile coverage mask; (iii) a variable shading rate; (iv) a primitive identifier value; and (v) a scissor index, with each different state type command being identifiable from its respective operating code portion. These commands can then be included, as necessary, into the sequence of commands for a primitive list, e.g. immediately before an associated primitive command, to selectively encode such state data.

In an embodiment these state type commands are fixed-size commands. Because they are dedicated for storing only a particular type of state data, the commands can however be relatively short. For instance, in an embodiment, at least some of the state type commands described above comprise 8-bit commands. Other arrangements would of course be possible, e.g. depending on the state data in question.

As explained above, the benefit of using these separate, dedicated state type commands is that the commands can be included (or not) in a primitive list in respect of a primitive depending on whether or not the state data has changed (e.g. since the previous state command, or from a default value). Thus, if a set of one or more primitives shares the same piece of state (meta) data, or the state (meta) data changes in a predictable manner between primitives (e.g. increases by one), only a single state-type command needs to be included into the primitive list for storing that piece of state data, e.g. rather than storing that data in respect of each of the individual primitives to which it applies (e.g. as may be the case when the state data is not stored using separate commands but is instead packeted together with the primitive data).

Thus, in this way, by only including such state commands when there is a change in state that needs to be explicitly stored, the state data can be more efficiently encoded into the overall primitive list. This works well because the state data is required less frequently that the primitive data (since it is only optionally required per-primitive, whereas the primitive data of course applies per-primitive), and so being able to selectively include state data (or not) to encode changes of state can significantly reduce the overall primitive list size.

The state data may be stored in the state type commands in any suitable and desired manner, e.g. depending on the type of state data in question.

In embodiments, to reduce the size of the commands, the state commands encode changes (differences) in state. That is, the state data is in an embodiment encoded and stored as a difference compared to another value. The changes in state can be encoded in any suitable manner. For example, a state data command may indicate changes in state relative to the previous primitive command. Thus, in that case, if no new state data command is sent for the current primitive, the current primitive uses the state data for the previous primitive. Alternatively, a state data command may indicate changes in state relative to a default or expected value. In that case, if no new state data command is sent, a default or expected value may be used. Various other arrangements would be possible, e.g. depending on the type of state data in question.

A primitive list according to the primitive list format of the technology described herein will also typically contain some configuration type data (the third type of data introduced above).

This configuration data typically applies to greater numbers of primitives, e.g. all of the primitives within a draw call, or even within the entire render output. For example, a sequence of primitives (e.g. relating to a set of one or more draw calls) included for a primitive list may start with a sequence of configuration data that is to be applied to all of the primitives within the sequence of primitives.

Some examples of configuration data that may be indicated using the configuration type commands of the technology described herein may include one or more of: (i) a depth range; (ii) a scissor box (to be used when scissoring operations are to be performed); (iii) a draw call descriptor or identifier; and (iv) an indicator of a pipeline or occlusion query to be performed (e.g. a query to determine if a group of primitives is visible or not, and hence how far along the rendering pipeline the primitives should be processed).

It will be appreciated that this configuration data is therefore typically included into a primitive list at a much lower frequency compared to the primitive and state data described above, e.g. on a per draw call basis, or even on a per-multiple draw call basis, rather than on a per-primitive basis.

An option for encoding such configuration data into the primitive list would be to have dedicated commands for each type of configuration data, e.g. similarly to the state data commands, above, each storing a particular type of configuration data in full. However, in that case, a separate operating code may be required for identifying each different type of configuration command, thus complicating the decoder logic. The technology described herein recognises that this may be inefficient, especially given the relatively low frequency with the configuration data is included.

Thus, in embodiments, a single configuration command (with a single operation code portion identifying the command) can be used for indicating a plurality of different types of configuration data that may (or may not) need to be included into the primitive list at that point. In particular, this is done by storing in the second portion of the command an indicator, e.g., and in an embodiment, comprising a bitwise mask and/or a set of flags, with the indicator (e.g. the bit values of the mask, or the flags) being set to indicate which types of configuration data are being stored in association with the configuration command.

The actual configuration data (the configuration payload) can then be included into the primitive list separately to, e.g. immediately after, the configuration command itself. Thus, a configuration command is in an embodiment followed in the primitive list by one or more sets of configuration payload data, corresponding to the type or types of configuration data indicated by the configuration command.

When the primitive list is read (decoded) to identify the configuration data, the primitive list reader can thus use the indicator (e.g. the bitwise mask and/or flags) to determine which types of configuration data follow the configuration command and process them accordingly.

There may be multiple (e.g. two) different types of configuration command that are configured to indicate different types of configuration data that is to be included into the primitive list. That is, a first configuration command may be used to indicate a first set of configuration type data that may be included into the primitive list and a second configuration command can be used to indicate a second set of configuration type data that may be included into the primitive list.

In an embodiment the actual configuration data that follows the configuration command has a pre-determined (and known) width so that primitive list reader can identify the configuration data boundaries accordingly.

In an embodiment, all of the configuration payloads that can be indicated by a given configuration command has the same size. In that case, the use of multiple different configuration type commands that are configured to store different types of data may facilitate storing different sizes of configuration payload. For instance, a first configuration command may be available that is configured to indicate types of configuration data having a first size (e.g. 32-bit configuration payload), and a second configuration command available to indicate types of configuration data having a second, different size (e.g. 64-bit configuration payload)

Other arrangements would however be possible. For example, it would also be possible to explicitly indicate the boundaries between different types of configuration data, e.g. by including a suitable indicator in the configuration data itself, in which case the different types of configuration payload following a configuration command need not all have the same size.

Thus, in embodiments, a configuration command of the technology described herein includes an indicator, in an embodiment comprising a bitwise mask, indicating which type of types of configuration data from a set of different types of configuration data, are included into the primitive list in association with the configuration command, and the configuration command is followed in the primitive list sequence by a set of configuration data corresponding to the type or types of configuration data indicated by the indicator (bitwise mask).

For example, a bitwise mask may comprise a number of bits that respectively represent different types of configuration data that may (or may not) follow the configuration command. If the first bit is set, this then means that the first set of configuration data following the configuration command corresponds to the type of configuration data indicated by the first bit, and so on. For instance, if the first and third bits of the bit mask are set, the configuration command will be followed by configuration data corresponding to the types of configuration data that is indicated respectively by the first and third bits (but not data corresponding to the type indicated by the second bit, if that is not set) and the decoding can therefore identify the configuration data accordingly using the bit mask (e.g. and the known size of the configuration data, or other boundary information).

In an embodiment, the configuration command also includes one or more flags that can be used in a similar way, to indicate other types of configuration payload that will follow the configuration command in the primitive list (when the flags are set). Other suitable indicators may also be used, as desired.

It is believed that this method for storing data in a primitive list is novel and advantageous in its own right, i.e. regardless of how any other data may or may not be stored in the primitive list. This method may also be applied to other types of primitive metadata. For example, at least some of the state data described above could also be stored in a similar fashion, rather than using the dedicated state type commands as indicated above.

Thus, a further embodiment of the technology described herein comprises a method of processing data in a graphics processing system in which a render output is sub-divided into a plurality of tiles for rendering, the method comprising: determining which primitives in a sequence of primitives to be processed for the render output are to be rendered for respective regions into which the render output is sub-divided for sorting the primitives; and preparing corresponding primitive lists for respective regions of the render output, each primitive list identifying a respective list of primitives that are to be rendered for the region of the render output to which the primitive list relates, wherein preparing a primitive list for a respective region of the render output comprises generating a sequence of commands identifying individual primitives that are to be rendered for the region of the render output to which the primitive list relates, the sequence of commands including at least one primitive metadata command identifying a set of primitive metadata that is to be applied when rendering one or more of the individual primitives for the region of the render output to which the primitive list relates, wherein there is a respective set of different types of primitive metadata that can be indicated by the at least one primitive metadata command, and wherein a primitive metadata command when generated for inclusion into the primitive list includes an indicator indicating which types of primitive metadata from the set of different types of primitive metadata that can be indicated by the primitive metadata command are included into the primitive list in association with the primitive metadata command, and wherein the primitive metadata command is followed in the sequence of commands generated for primitive list by a corresponding set of primitive metadata including primitive metadata of the type or types of primitive metadata indicated by the indicator included within the primitive metadata command.

Another embodiment of the technology described herein comprises a graphics processing system in which a render output is sub-divided into a plurality of tiles for rendering, the graphics processing system comprising: a tiling circuit that is operable to perform tiling operations comprising determining which primitives in a sequence of primitives to be processed for a render output are to be rendered for respective regions into which the render output is sub-divided for sorting the primitives; and a primitive list preparation circuit that is configured to prepare corresponding primitive lists for respective regions of the render output, each primitive list identifying a respective list of primitives that are to be rendered for the region of the render output to which the primitive list relates, wherein preparing a primitive list for a respective region of the render output comprises generating a sequence of commands identifying individual primitives that are to be rendered for the region of the render output to which the primitive list relates, the sequence of commands including at least one primitive metadata command identifying a set of primitive metadata to be applied when rendering one or more of the individual primitives for the region of the render output to which the primitive list relates, wherein there is a respective set of different types of primitive metadata that can be indicated by the at least one primitive metadata command, and wherein a primitive metadata command when generated for inclusion into the primitive list includes an indicator indicating which types of primitive metadata from the set of different types of primitive metadata that can be indicated by the primitive metadata command are included into the primitive list in association with the primitive metadata command, and wherein the primitive metadata command is followed in the sequence of commands generated for primitive list by a corresponding set of primitive metadata including primitive metadata of the type or types of primitive metadata indicated by the indicator included within the primitive metadata command.

As will be appreciated by those skilled in the art, these embodiments of the technology described herein can, and in an embodiment do, comprise any one or more or all of the features of the technology described herein described herein, as appropriate.

In particular, the indicator of the primitive metadata that follows the primitive metadata command in an embodiment comprises a bitwise mask and/or set of flags, with the bit positions or flags being set accordingly to indicate the type or types of primitive metadata (e.g. state or configuration data) that follows the primitive metadata command, as described above. A benefit of this approach is that it is easy to include further types of data, e.g. simply by adding or using an appropriate extra bit to the bitwise mask, or an additional flag bit. This therefore provides a very flexible and efficient approach for storing data that may apply to plural primitives.

The "primitive metadata" that is stored in this way may comprise any (or all) of the types of state and configuration data described above. However, in embodiments the primitive metadata that is stored in this way comprises configuration type data, i.e. the third type of data identified above, e.g. that applies to groups of plural set of primitives. That is, because such data will typically be sent least frequently, and so this approach may be particularly efficient, as it allows a large amount of configuration type data to be indicated relatively cheaply (using a single operation code). On the other hand, because the state data varies more frequently (e.g. on an optional per-primitive basis), it may be more efficient to use dedicated state type commands, as discussed above.

Various other arrangements for storing any of the first, second and third types of data would of course be possible.

That is, the technology described herein, by recognising that these different types of data are required, and can be grouped and stored separately on this basis, then permits various different optimisations of how each type of data is stored. This can then reduce the overall size of the primitive lists, in turn reducing memory bandwidth/storage requirements.

Thus, the technology described herein recognises that the data that is desired to be stored in a primitive list can be grouped into (e.g.) three identifiably different types of data, each having a different associated lifetime. The technology described herein further recognises that it may therefore be beneficial to store these different types of data separately in the primitive list, using different respective types of commands, as this can then facilitate a more efficient encoding of the data into the primitive list.

For example, at least some of the data could otherwise be packeted together, into a single command that stores multiple different types of data. However, the technology described herein recognises that because of the different lifetimes of the different types of data, it may be better to store the different types of data separately, so that the different types of data can be handled differently.

By providing a more efficient encoding of the various different types of data into a primitive list, this in turn facilitates smaller primitive lists, thereby reducing memory storage/bandwidth requirements.

The technology described herein may thus provide various benefits compared to other approaches for encoding data into such primitive lists. In the technology described herein, a render output (e.g. frame) is sub-divided into a plurality of regions for rendering. Each region corresponds to a respective area of the render output. This sub-division can be performed in any suitable manner, as desired. In an embodiment, the regions are rectangles, e.g. squares, but other arrangements would be possible.

The primitive lists of the technology described herein may have any suitable correspondence with the regions into which the render output is sub-divided. For example, a primitive list may be prepared for each region, on a one-to-one basis. However, it may also be the case that a primitive list is prepared for a plurality of regions, or that multiple primitive lists are prepared that cover a single region. Various arrangements are possible in this regard and the technology described herein can be applied to any suitable primitive lists.

Whilst the technology described herein has been described above primarily in relation to preparing a single primitive list, for a respective region of the render output, it will be appreciated that the graphics processing system typically, and in an embodiment, will prepare a plurality of primitive lists, e.g. so that all of the regions into which the render output is divided for the purposes of sorting the primitives have a corresponding one or more primitive lists. Thus, in embodiments, the steps described above are repeated in order to prepare a plurality of primitive lists.

Likewise, whilst the technology described herein is described above in relation to storing data for a sequence of primitives, it will be appreciated that a given render output may have multiple sequences of primitives defined for it, and in an embodiment all of the primitive sequences are processed in the same way.

The description above focusses on the preparation of the primitive lists. The primitive lists that are generated in this way are in an embodiment then written back to memory so that they can subsequently be fetched into a rendering pipeline of the graphics processor for rendering the scene (although other arrangements would of course be possible—for example, the primitive lists may be written out directly to local storage on the graphics processor for access by the rendering pipeline).

Once the primitive lists have been generated and written out, the primitive lists can then be used, e.g. in the normal way, to generate the desired render output. For instance, once the primitives and their vertices have been defined, and the vertex data obtained, this vertex data can then be processed by a graphics processing system, in order, e.g. to display the desired render output. This processing basically involves determining which sampling points of an array of sampling points covering the output area to be processed are covered by a primitive, and then determining the appearance each sampling point should have (e.g. in terms of its colour, etc.) to represent the primitive at that sampling point. These processes are commonly referred to as rasterising and rendering, respectively. These processes can use the primitive lists generated according to the technology described herein. Particularly, the system may read the primitive lists in order to determine which primitives need to be rendered for which tile (thus avoiding unnecessary processing for any primitives that do not appear in a particular tile).

So, the primitive lists generated according to the technology described herein may be passed into a graphics processing (rendering) pipeline, and used thereby in order to render a desired output. The graphics processing pipeline may contain any suitable and desired processing stages that a graphics processing pipeline may contain. In an embodiment, it includes, in an embodiment in this order, one or more of, and in an embodiment all of: a rasteriser; an early depth (or an early depth and stencil) tester; a renderer, in an embodiment in the form of a fragment shader; a varyings position evaluation (interpolator) associated with the fragment shader; a late depth (or depth and stencil) tester; a blender; one or more tile buffers; and a tile write back unit.

Accordingly, the technology described herein also extends to graphics processing systems, and methods of graphics processing, that use the primitive lists prepared according to embodiments of the technology described herein.

So, from a further embodiment comprises a method of graphics processing comprising preparing a set of primitive lists according to the methods of the technology described herein, and then using the primitive lists to render an output.

When primitive lists are used, they are in an embodiment decoded, with the decoding in an embodiment operating in reverse to the encoding described above. Thus, a primitive list reader is configured to read the sequence of commands for the primitive list, identify the respective type of command, and then decode the stored information appropriately for use during the rendering process.

From yet another embodiment comprises a graphics processing system comprising a tiler pipeline for preparing a set of primitive lists substantially as described above any embodiments of the technology described herein, and a graphics processor that is configured to use the primitive lists when rendering an output. The graphics processor may suitably comprise a graphics processing (rendering) pipeline, e.g. as described above.

Although the above embodiment has been described with reference to using the primitive lists to indicate primitives to be rendered for the rendering process, it will be appreciated these lists could also or instead be used for other purposes, such as to perform (e.g. initial) culling, and/or hidden surface removal, of graphics data and descriptors.

The technology described herein may generally find application in any suitable tile-based rendering graphics processing system. The technology described herein can be used for all forms of output that a graphics processing pipeline may be used to generate, such as frames for display, render-to-texture outputs, etc.

In some embodiments, the graphics processing system comprises, and/or is in communication with, one or more memories and/or memory devices that store the data described herein, and/or store software for performing the processes described herein. The graphics processing system may also be in communication with a host microprocessor, and/or with a display for displaying images based on the data generated by the graphics processing system.

In an embodiment, the various functions of the technology described herein are carried out on a single graphics processing platform that generates and outputs the rendered fragment data that is, e.g., written to a frame buffer for a display device.

The technology described herein can be implemented in any suitable system, such as a suitably configured microprocessor based system. In an embodiment, the technology described herein is implemented in a computer and/or micro-processor based system.

The various functions of the technology described herein can be carried out in any desired and suitable manner. For example, the functions of the technology described herein can be implemented in hardware or software, as desired. Thus, for example, the various functional elements, stages, and pipelines of the technology described herein may comprise a suitable processor or processors, controller or controllers, functional units, circuits/circuitry, processing logic, microprocessor arrangements, etc., that are operable to perform the various functions, etc., such as appropriately configured dedicated hardware elements or processing circuits/circuitry, and/or programmable hardware elements or processing circuits/circuitry that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuits/circuitry, if desired.

Thus the technology described herein extends to a graphics processor and to a graphics processing platform including the apparatus of or operated in accordance with any one or more of the embodiments of the technology described herein described herein. Subject to any hardware necessary to carry out the specific functions discussed above, such a graphics processor can otherwise include any one or more or all of the usual functional units, etc., that graphics processors include.

It will also be appreciated by those skilled in the art that all of the described embodiments of the technology described herein can, and in an embodiment do, include, as appropriate, any one or more or all of the features described herein.

The methods in accordance with the technology described herein may be implemented at least partially using software e.g. computer programs. It will thus be seen that when viewed from further embodiments the technology described herein provides computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processor may be a microprocessor system, a programmable FPGA (field programmable gate array), etc.

The various circuitry, functional elements, stages, and units of the technology described herein may comprise a suitable processor or processors, controller or controllers, functional units, circuitry, circuits, processing logic, microprocessor arrangements, etc., that are operable to perform the various steps or functions, etc., such as appropriately dedicated hardware elements (processing circuits/circuitry) and/or programmable hardware elements (processing circuits/circuitry) that can be programmed to operate in the desired manner.

The technology described herein also extends to a computer software carrier comprising such software which when used to operate a graphics processor, renderer or microprocessor system comprising a data processor causes in conjunction with said data processor said processor, renderer or system to carry out the steps of the methods of the technology described herein. Such a computer software carrier could be a physical storage medium such as a ROM chip, RAM, flash memory, CD ROM or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein provides computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions fixed on a tangible medium, such as a non-transitory computer readable medium, for example, diskette, CD-ROM, ROM, RAM, flash memory or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, preloaded with a computer system, for example, on a system ROM or fixed disk, or distributed from a server or electronic bulletin board over a network, for example, the Internet or World Wide Web.

The technology described herein relates to graphics processing systems that use so-called "tile-based" rendering. In tile-based rendering, the two-dimensional scene to be displayed is sub-divided or partitioned into a plurality of smaller sub-regions, usually referred to as "tiles". The tiles (sub-regions) are each rendered separately (typically one-after-another). The rendered sub-regions (tiles) are then recombined to provide the complete frame for display. In such arrangements, the scene is typically divided into regularly-sized and shaped sub-regions (tiles) (they are usually e.g., squares or rectangles) but this is not essential.

The advantage of such tile-based rendering is that primitives that do not appear in a given tile do not have to be processed for that tile, and therefore can be ignored when the tile is processed. This can allow the overall amount of graphics processing necessary for a given scene to be reduced.

In a tile-based rendering system, it is accordingly usually desirable to be able to identify and know those primitives that are actually present in a given sub-region (tile), so as to, e.g., avoid unnecessarily rendering primitives that are not actually present in a tile. In order to facilitate this, it is known to prepare for each sub-region (tile) a list of the primitives to be rendered for that sub-region (e.g. that will appear in the sub-region). Such a "primitive list" (which can also be referred to as a "tile-list") identifies (e.g. by reference to a primitive indicator) the primitives to be rendered for the tile (sub-region) in question.

The process of preparing primitive lists for each sub-region (tile) to be rendered basically therefore involves determining the primitives that should be rendered for a given sub-region (tile). This process is usually carried out by determining (at a desired level of accuracy) the primitives that intersect (i.e. that will appear (at least in part) within) the tile in question, and then preparing a list of those primitives for future use by the graphics processing system. (It should be noted here that where a primitive falls into more than one tile (as will frequently be the case), it is included in the primitive list for each tile that it falls within.) In effect, each sub-region (tile) can be considered to have a bin (the primitive list) into which any primitive that is found to fall within (i.e. intersect) the sub-region is placed (and, indeed, the process of sorting the primitives on a tile-by-tile basis in this manner is commonly referred to as "binning").

The process of determining the primitives that should be listed (rendered) for any given tile described above (the "binning" process) can be carried out at varying levels of precision, for example depending on efficiency optimisations for different parts of the tiling and rendering processes. For example, at the most precise level, it could be determined exactly which tiles a given primitive will appear at least in part in, and the primitive then included in the primitive lists for those tiles only. This is commonly referred to as "exact" binning.

FIG. 1 illustrates an exact binning process. As shown in FIG. 1, the scene 1 to be displayed is divided into sixteen regularly sized sub-regions or tiles 2. It is then determined for each primitive in the scene, which tile or tiles the primitive actually appears (falls) within. The primitive is added to the primitive list for each tile that it is found to fall within. Thus, taking the example shown in FIG. 1, the primitive 3 is added to the primitive list for tile 4, the primitive 5 is included in the primitive list for tiles 6 and 7, the primitive 8 is included in the primitive lists for tiles 9, 10, 11 and 12, and the primitive 13 is included in the primitive list for tile 12. (It should be noted here that FIG. 1 shows only a few tiles and primitives for clarity purposes. As will be appreciated by those skilled in the art, in an actual graphics processing operation, there will typically be many more primitives and tiles.)

It is also known to prepare primitive lists with a lower precision than is achieved with exact binning. This can be useful to, e.g., simplify the preparation of the primitive lists. One common "less precise" binning technique is "bounding box" binning. In this case, a so-called "bounding box" is drawn around a primitive or a set of primitives, and then the tiles covered by the bounding box are determined. The primitive or primitives that the bounding box represents (i.e. that are encompassed by the bounding box) are then listed (binned) for each tile that the bounding box has been found to cover (at least in part).

This arrangement thus uses a bounding box to determine the tiles for which a given primitive should be listed to be rendered, rather than the primitive itself. This can mean, e.g., that a primitive may be listed for rendering for a tile that it does not actually fall within (e.g. if the bounding box does not sufficiently tightly or precisely surround the primitive), but on the other hand, the use of bounding boxes in this manner can simplify the preparation of the primitive lists.

Once lists of primitives to be rendered (primitive lists) have been prepared for each sub-region (tile) in this way, the (primitive) lists are stored for use, e.g., to allow the system to identify which primitives need to be considered (and rendered) when the tile in question is rendered.

Such tile-based rendering arrangements have been found to work well, as they can, for example, help to avoid primitives still being processed for regions of the scene where they are not present.

Figure 2:
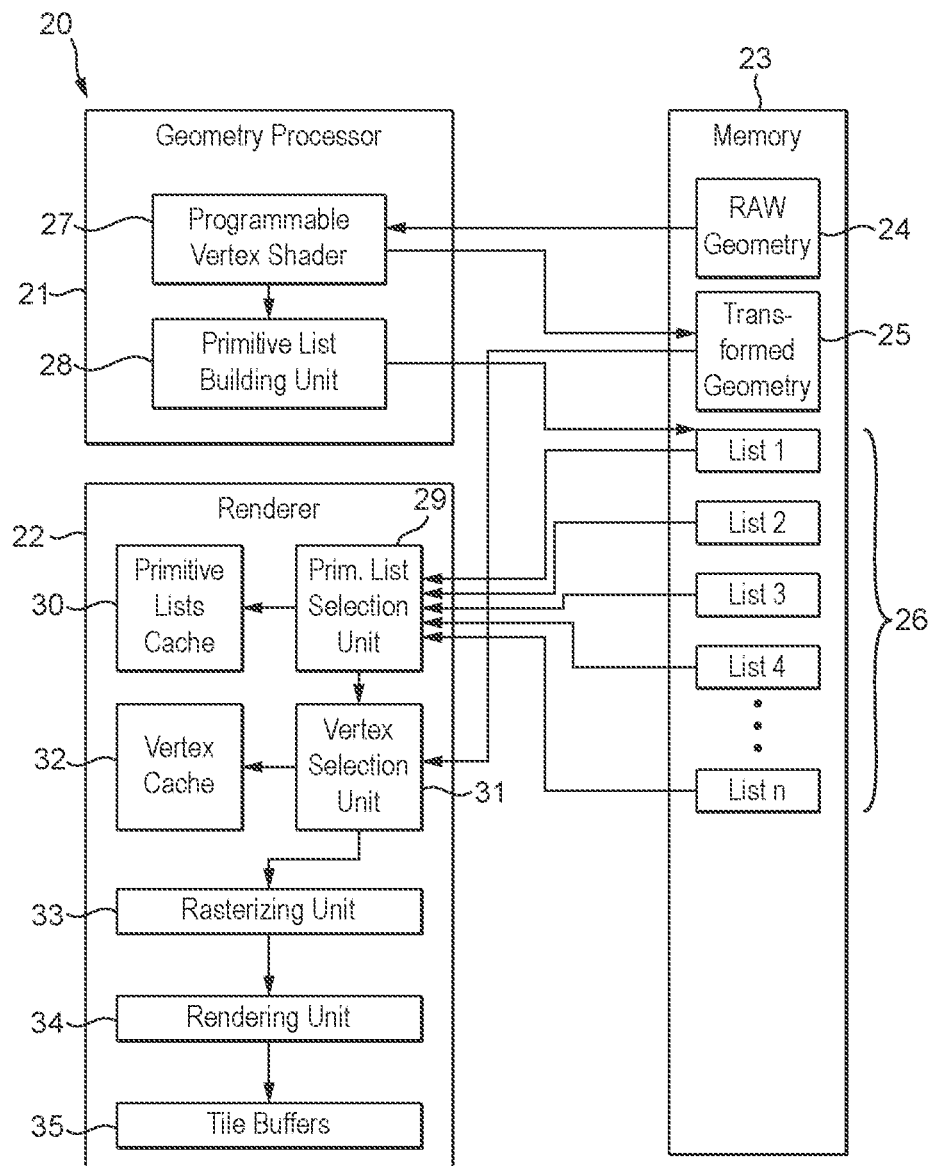
FIG. 2 shows schematically an arrangement of a graphics processing system that can be operated in accordance with the technology described herein.

FIG. 2 shows schematically a graphics processor 20 that may be operated in accordance with the technology described herein. The graphics processor 20 includes a geometry processor 21, and a renderer 22, both of which can access a memory 23. The memory 23 may be "on-chip" with the geometry processor 21 and renderer 22, or may be an external memory that can be accessed by the geometry processor 21 and renderer 22.

The memory 23 stores, inter alia, and as shown in FIG. 2, a set of raw geometry data 24 (which is, for example, provided by the graphics processor driver or an API running on a host system (microprocessor) of the graphics processor 20), a set of transformed geometry data 25 (which is the result of various transformation and processing operations carried out on the raw geometry 24), and a set of primitive lists 26. The primitive lists 26 are prepared in accordance with the technology described herein. This process will be described in more detail below.

The transformed geometry data 25 comprises, for example, transformed vertices (vertex data), etc.

The geometry processor 21 comprises, inter alia, a programmable vertex shader 27, and a primitive list building unit 28. The programmable vertex shader 27 takes as it input the raw geometry data 24 stored in the memory 23, and processes that data to provide transformed geometry data 25 (which it then stores in the memory 23) comprising the geometry data in a form that is ready for two-dimensional ('2D') placement in the frame to be displayed. The programmable vertex shader 27 and the processes it carries out can take any suitable form and be any suitable and desired such processes.

The primitive list building unit 28 carries out the tiling and primitive list preparation processes of the technology described herein of allocating the draw calls to the primitive lists which are then used by the renderer 22 to identify the draw calls that should be rendered for each sub-region of the scene to be rendered (and includes suitable circuitry for doing this). To do this, the primitive list building unit 28 takes as its input the transformed and processed vertex data from the programmable vertex shader 27 (i.e. the positions of the graphics object in the scene), builds primitive lists using that data, and stores those lists as the primitive lists 26 in the memory 23. The renderer 22 includes a primitive list selection unit 29, a primitive list cache 30, a vertex selection unit 31, a vertex data cache 32, a rasterising unit 33, a rendering unit 34, and tile buffers 35.

The rasterising unit 33, rendering unit 34, tile buffers 35 operate, in this embodiment, in the same manner as such units normally operate in graphics processing systems. Thus the rasterising unit 33 takes as its input a primitive and its vertices, rasterises the primitive to fragments, and provides those fragments to the rendering unit 34. The rendering unit 34 then performs a number of rendering processes, such as texture mapping, blending, shading, etc. on the fragments, and generates rendered fragment data which it stores in the tile buffers 35 for providing to a frame buffer for display.

The primitive list selection unit 29 of the renderer 22 determines which draw call, and hence which primitive, is to be rendered next. It does this by considering the primitive lists 26 stored in the memory 23, and selecting from one of those lists the next graphics object (draw call) to be rendered.

The primitive list selection unit 29 can also place one or more primitive lists in the primitive list cache 30. The primitive list selection unit 29 provides the primitive that it has selected for rendering next to the vertex selection unit 31. In response to this, the vertex selection unit 31 retrieves the appropriate transformed vertex data for the primitive in question from the transformed geometry data 25 stored in the memory 23, and then provides the primitive (i.e. its transformed vertex data) to the rasterising unit 33 for processing. The vertex selection unit 31 can cache vertex data that it has retrieved from the memory 23 in the vertex data cache 32, if desired.

Figure 3:
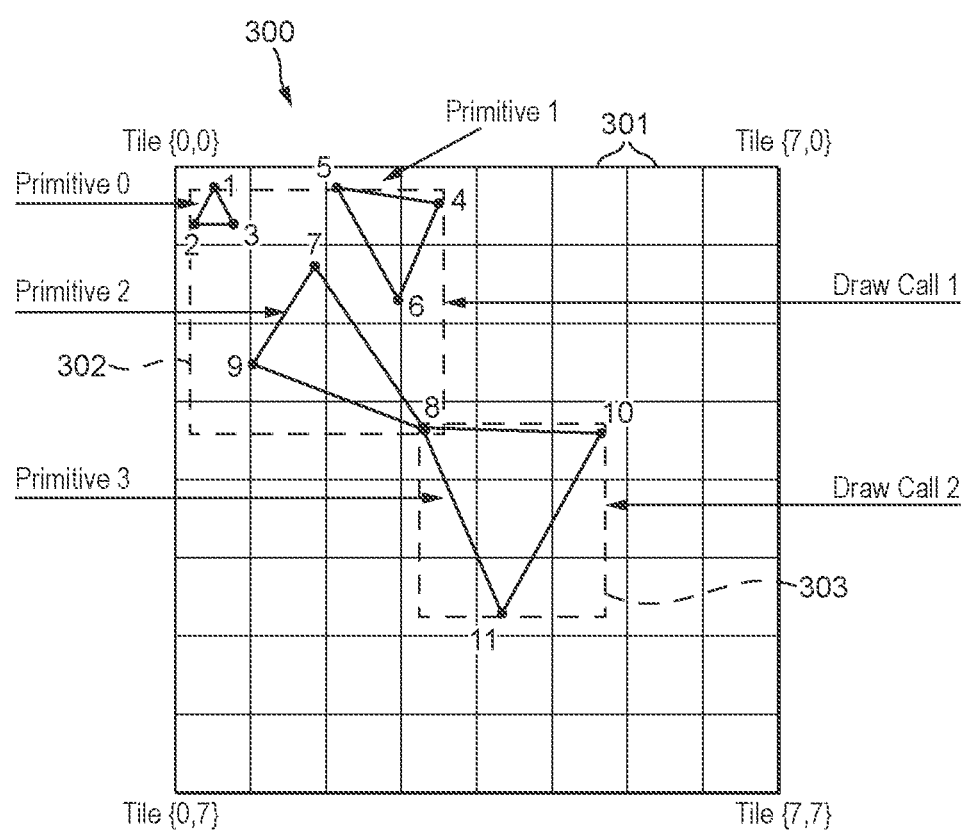
FIG. 3 shows an example scene of primitives to be displayed.

FIG. 3 shows an exemplary scene to be displayed that will be used as the exemplary scene for display in the description of this embodiment of the technology described herein.

As can be seen from FIG. 3, the scene 300 contains four primitives, which are grouped into two "draw calls", draw call 1 and draw call 2. Primitives 0, 1 and 2 are grouped as draw call 1, and primitive 3 belongs to draw call 2. (Grouping primitives in "draw calls" basically means that the application programmer wants all the primitives in the draw call to be drawn in one go, typically for performance reasons. Primitive groups in the same draw call typically share the same state and shader programs data.)

It should also be noted here that in view of the fact that there are two separate draw calls, with primitive 2 in one and primitive 3 in the other, the vertex 8 shown in FIG. 3 cannot be shared between primitive 2 and primitive 3, but instead is represented when the vertices are defined for the different draw calls as two different vertices, with the same vertex location and vertex attributes.

As shown in FIG. 3, the scene 300 to be rendered is divided into plural individual sub-regions or tiles 301. As will be appreciated by those skilled in the art, in practice any given scene to be rendered will typically comprise many more primitives and draw calls than the four primitives and two draw calls shown in FIG. 3. However, FIG. 3 shows four primitives and two draw calls only for simplicity and clarity purposes.

In the present embodiment, the primitive list building unit 28 determines the location of each draw call, Draw Call 1 and Draw call 2, and lists the draw calls in a primitive list for each tile which the draw call falls within. In this way, the system can identify which draw calls should be rendered for each sub-region.

This could be done using, e.g., an exact binning technique, in which case the primitive list building unit 28 uses the determined transformed vertex positions it is provided with for a given draw call by the programmable vertex shader 27 to identify which sub-regions and sets of sub-regions the draw call falls within (intersects).

As will be appreciated by those skilled in the art, other techniques for determining and locating the draw calls within the scene and in relation to the sub-regions (tiles) 301 could be used if desired. For example, bounding box techniques could equally be used. FIG. 3 shows exemplary bounding boxes 302, 303 for the draw calls, Draw call 1 and Draw Call 2. (Where a bounding box technique is used, the bounding box may be generated as part of the primitive list building process, e.g., by the primitive list building unit, but other arrangements would, of course, be possible.)

This process is repeated by the primitive list building unit 28 for each and every draw call in the scene to be rendered in turn, until complete primitive lists 26 (lists of draw calls) have been generated for each tile that the scene to be rendered is divided into.

The primitive list building unit 28 in the present embodiment places the draw calls in the primitive lists 26 in the order that it receives the draw calls from the programmable vertex shader 27. This means that, so far as each individual primitive list 26 is concerned, the draw calls are listed according to the desired order of rendering the draw calls for that tile.

As discussed above, the renderer 22 also includes a primitive list cache 30 and a vertex data cache 32. These caches may comprise local memory provided on the renderer 22 that can be more rapidly accessed by processing units of the renderer (and in particular the primitive list selection unit 29 and vertex selection unit 31, respectively) than the main memory 23.

The primitive list selection unit 29 is configured to store in the primitive list cache 30 one or more primitive lists 26 that it has read from the main memory 23.

The vertex selection unit 31 can similarly cache vertex data that it retrieves from the transformed geometry data 25 in the memory 23 in the vertex data cache 32, again in particular where it can be identified that the vertex data will be required for a primitive again.

The technology described herein relates to the generation of the primitive lists 26 by the primitive list building unit 28, and in particular to the format in which data is encoded into the primitives lists 26 for use by the renderer 22.

According to the new primitive list format of the technology described herein, there are three separately identifiable types of command that can be used to store a respective three different types of data, as will be explained further below.

In particular, the technology described herein recognises that the data that may desirably be stored within a primitive list 26 can be grouped into three different types of data, based on the associated lifetime of the data within the rendering process, and that it may be better to store the different types of data, separately, using different respective types of commands.

FIG. 4 is a table summarising by way of example the various different types of commands that may be used with the new primitive list format an embodiment of the technology described herein.

As shown in FIG. 4, the commands defined for the primitive list format of the present embodiment can be grouped into three main, different types of commands:
(i) primitive commands ('prim');
(ii) state commands (state); and
(iii) configuration commands ('cfg').

The formats and purpose of these different types of commands will be explained further below.

Within each of these main types of commands, there may be further (sub-) types, such as different types of primitive commands, different types of state commands, etc., as is also shown in FIG. 4. Each of the different commands is identifiable by a respective operating code (opcode) (as stored in the identifier (ID) field, shown on the left hand side of FIG. 4).

Whilst FIG. 4 summarises a particular set of commands that are available to be used according to one primitive list format of an embodiment of the technology described herein, it will be appreciated that there may be various other commands that can be included into primitive lists in embodiments (and correspondingly not all of the command shown in FIG. 4 need to be used (or usable) for a primitive list in accordance with the technology described herein).

Thus, it will be understood that FIG. 4 is just showing one possible example of a primitive list format an embodiment of the technology described herein, but other arrangements would of course be possible. The different types of commands will now be described, by way of example, in order to illustrate the improvements that may be provided by embodiments of the technology described herein.

1. Primitive Commands

The primitive commands (type='prim' in FIG. 4) are dedicated for storing actual primitive data identifying the individual primitives that are to be encoded into the primitive list. In particular, a primitive command stores a set of primitive vertex index values defining a respective primitive. The vertex index values are stored in a compressed form, as difference or delta values, as will be explained further below.

In the FIG. 4 example, there are three different primitive type commands, which differ primarily in terms of their size, i.e. how many bits are available for storing the vertex index (delta) values. In particular, in the present example, three types of primitive command are available, respectively 'prim8' (which is an 8-bit command), 'prim16' (a 16-bit command), and 'prim32' (a 32-bit command).

The respective formats for the three different primitive type commands that are used in this example are described below.

TABLE 1 prim8 command format

| Field | Width |
|---|---|
| ID | 1 |
| i0 | 3 |
| i1 | 2 |
| i2 | 2 |

In the prim8 type command (Table 1), the identifier field (ID) stores a respective opcode uniquely identifying that the command is a prim8 command. In this example the opcode for the prim8 type command (ID=op_0) uses a single bit (since 'prim8' commands are expected to be included relatively frequently, such that using a smaller opcode may be beneficial in terms of reducing the size of the 'prim8' command and hence the overall primitive list), but other arrangements would of course be possible.

The other fields in the prim8 command are then used to store delta compressed values for the primitive vertex indices. Thus, in this example, the primitive has three vertices, and the respective vertex index deltas are stored in three respective fields (i0, i1 and i2). (For other types of primitives, the available fields may be used, as desired, for storing any suitable and desired information that may be required for the primitive. For example, for points and lines, one of the fields (e.g. the index 2 field, i2) may be used to store the point size. Any such extra information that may be required for a primitive may be stored in any suitable format, e.g. compressed or not.)

In particular, the vertex index values for the primitive are stored in the respective fields by calculating the deltas (differences) between: the current index 0 and the previous index 0 in the primitive list (for the first index value, which delta is stored in field i0—note that if there is no previous index 0 available, a value of zero is used by default); the current index 1 and current index 0 (for the second index value, which delta is stored in field i1); and current index 2 and current index 0 (for the third index value, which delta is stored in field i2).

In the present embodiment, rather than storing the deltas in their 'raw' form, various offsets are applied to reduce the size of the deltas (to make them less positive). This then allows a greater range of positive values to be stored using fewer bits. For example, when storing the first index delta (index 0), a negative offset of two is applied to the delta, and the reduced delta value is then stored. This effectively increases the range of positive deltas that can be stored by two.

Furthermore, in the present embodiment, the second and third index deltas (index 1 and index 2) do not encode a zero value, as the indices within the same primitive should not be the same. Thus, when the second or third index delta is positive, a negative offset of one is applied to the delta (but not offset is applied when the delta is negative).

The primitive vertex index compression scheme in the tiler thus works as set out below. This compression scheme determines the (reduced) delta values to be stored, and also determines the numbers of bits to encode each of the respective delta values.

Firstly, the delta index is calculated for the first index (index 0) compared to the previous index (last_index 0) in the primitive list. An offset of minus two is then applied to calculate the reduced value that is to be stored in field i0:

delta_index0[31:0]=index0[31:0]−last_index0[31:0]
   ##value wraps around ##i0[31:0]=delta_index0[31:0]−2 ##value wraps around ##

The delta index values are then calculated for the second and third indices (index 1 and index 2) compared to the first index (index 0). As part of this, if the delta value is positive, an offset of minus one is applied.

delta_index1 [31:0]=index1 [31:0]−index0[31:0] ##value wraps around ##
i1 [31:0]=delta_index1 [31:0]
if not (delta_index1 [31]):
i1 [31:0]=delta_index1 [31:0]−1 ##NEVER wraps around as delta cannot be 0 ##
delta_index2[31:0]=index2[31:0]−index0[31:0]  ##value wraps around ##
i2[31:0]=delta_index2[31:0]
if not (delta_index2[31]):
i2[31:0]=delta_index2[31:0]−1 ##NEVER wraps around as delta cannot be 0 ##

The number of bits to encode each of the (reduced) delta values in the respective fields (i0, i1 and i2) is then calculated, as below. Note that in each case an additional bit is needed for storing the sign value. This information is used to select which of the primitive commands to store the primitive in, e.g. by selecting the appropriately sized primitive command (or set of primitive commands) based on the number of bits that are required to be stored.

```
if (i0[31]):
    bits_to_encode_i0 = bits(abs(i0)-1) + 1
else:
    bits_to_encode_i0 = bits(abs(i0)) + 1
if (i1[31]):
    bits_to_encode_i1 = bits(abs(i1)-1) + 1
else:
    bits_to_encode_i1 = bits(abs(i1)) + 1
if (i2[31]):
    bits_to_encode_i2 = bits(abs(i2)-1) + 1
else:
    bits_to_encode_i2 = bits(abs(i2)) + 1
```

The decompression performed by the primitive list reader when a primitive command is encountered then reverses the compression steps performed above. So, when decoding the first index delta (index 0), the negative two offset is reversed (i.e. by adding two to the value). Likewise, when decoding the second and third index deltas, if the stored values are positive (or zero), the negative one offset is reversed to recover the actual delta values. The last index is also sent and used with the decoded deltas to determine the full vertex indices.

The prim16 and prim32 command formats are set out below, and generally have a similar format to the prim8 command shown in Table 1, but with larger fields for storing larger vertex index deltas. The vertex index deltas are in an embodiment stored in the respective fields in the prim16 and prim32 commands in same manner described above for the prim8 command, using the same compression technique.

TABLE 2 prim16 command format

| Field | Width |
|---|---|
| ID | 2 |
| Cont | 1 |
| i0 | 5 |
| i1 | 4 |
| i2 | 4 |

TABLE 3 prim32 command format

| Field | Width |
|---|---|
| ID | 5 |
| Cont | 1 |
| i0 | 10 |
| i1 | 8 |
| i2 | 8 |

The prim16 and prim32 commands can thus be identified by their respective operating codes (opcodes), as indicated in the respective identifier (ID) field. In this example, the prim16 opcode (op_1 ' in FIG. 4) is a 2-bit value, whereas the prim32 opcode (op_7' in FIG. 4) is a 5-bit value. However, other arrangements would be possible. As shown in Tables 2 and 3, the prim16 and prim32 commands also include an additional continuation bit (in the 'cont' field) the value of which indicates whether (or not) the encoding continues onto the next command. The purpose of this continuation bit is to allow select combinations of primitive commands to be used for storing data for a single primitive (e.g. where the vertex index deltas are too large to fit in a single prim8/prim16/prim32 command), as will be explained further below.

At least one of these primitive commands is therefore always required whenever a new primitive is to be included into the primitive list. However, in the present example, a selection between the prim8/prim16/prim32 commands can be made based on the size of the index values that are to be encoded. Thus, if the delta index values for the primitive can fit inside a single prim8 command, the prim8 command is used. However, if the delta index values are too large to fit inside a prim8 command, a prim16 or prim32 command may instead be used.

As alluded to above, the present embodiment also allows combinations of two or more primitive commands to be used, in order to store larger delta values. In embodiments, in order to simplify the decoding logic, the possible combinations of primitive commands are restricted. Thus, in the present example, only certain combinations of primitive commands from all of the different possible combinations of primitives are permitted to be used. Any suitable combinations of primitives may be used. In an example, the combinations are restricted so that there can be only ever be one prim8 or prim16 command in a combination of commands, whereas multiple prim32 commands can be used. In that case, valid combinations of commands might include some of the examples given in Table 4 below.

There may also be a maximum number of commands that can be validly combined. For example, in an embodiment, up to four primitive commands may be combined to store data for a single primitive (in which case the maximum valid sequence of commands may be a combination of four prim32 commands, if that combination is permitted). However, the restricted set of combinations that can be validly used may be selected as desired in any suitable manner.

TABLE 4

Example combinations of primitive commands

| Commands (MSB to LSB) | Available bits to encode i0 | Available bits to encode i1/i2 |
|---|---|---|
| prim8 | 3 | 2 |
| prim16 | 5 | 4 |
| prim8 prim16 | 8 | 6 |
| prim32 | 10 | 8 |
| prim8 prim32 | 13 | 10 |
| prim16 prim32 | 15 | 12 |
| prim32 prim32 | 20 | 16 |
| prim8 prim32 prim32 | 23 | 18 |
| prim16 prim32 prim32 | 25 | 20 |

The number and type of primitive commands that are included for a given primitive therefore depends on the required number of bits to encode each of the indices for the primitive, as calculated using the compression scheme above. Thus the appropriate command or combination of commands can be selected based on the calculated values bits_to_encode_i0, bits_to_encode_i1, bits_to_encode_i2, in order to fit the vertex index deltas into the command(s).

As mentioned above, where combinations of commands are used, the continuation bit ('cont') in the prim16/prim32 commands is then set accordingly to one, to indicate that there are more commands to encode for that primitive. The commands are sent starting from the LSB index values. So, when a combination of prim8 and prim32 command are used, the prim32 command (storing the LSB index values) is in an embodiment sent first. This means in this example, where the available combinations are restricted such that only a single prim8 command is ever sent, the prim8 command does not need to store a continuation bit (and this is therefore not done). However, other arrangements would be possible.

By using the primitive commands described above, the present embodiment thus enables variable length encoding of the primitives using the different (combinations of the) available primitive commands.

It will be appreciated that this therefore allows for a more efficient approach for encoding the primitive data (the vertex indexes) as the amount of data used to store a primitive can be selected appropriately based on the size of the data.

It will also be appreciated from the above that the primitive commands store only the data actually identifying the individual primitives themselves, but do not in the present embodiment store any other, e.g. state, data describing the primitives, or how they should be processed. Such state type data is instead in the present embodiment stored using respective state commands, as will be described below. This helps simplify the primitive commands since they are dedicated for storing primitive data (the vertex index deltas).

2. State Commands

The state commands are used to encode metadata representing processing operations or parameters that should be used when rendering individual primitives. This data is therefore associated with the primitives and so may vary on a per-primitive basis. However, this data may also be shared between primitives, or at least may vary in a predicable manner, such that it does not always need to be encoded between primitives.

Thus, in the present embodiment, a number of dedicated state data commands are available that can be used to encode the different types of state information at the appropriate positions within the primitive list. There are various examples of such data, each having their own respective state-type command, as will be explained further below.

It will be appreciated that the use of dedicated state type commands simplifies the format of these commands, so that the respective state commands can be relatively small. For example, in the present embodiment, the state type commands are generally 8-bit commands, except for the full primitive identifier command which is a 32-bit command but is only used when the primitive identifier cannot fit into the short (8-bit) primitive identifier command.

It will also be appreciated that the state type commands described below are merely some examples of possible state type commands and that other state type commands may be used, or different formats may be used to those set out below, depending on the types of state data that are desired to be encoded for the graphics processing system in question.

i) Timestamp (ts8)

The timestamp command (ts8) encodes delta compressed value of the timestamp. The format of this command is set out below:

TABLE 5 timestamp command format

| Field | Width |
| --- | --- |
| ID | 4 |
| Ts | 4 |

The first field includes the opcode identifying that this is a timestamp command. In this example, the opcode for the timestamp command is a 4-bit value. However, other arrangements would of course be possible. The timestamp value is then included in the second field. In this example, the timestamp is sent as an unsigned delta compressed timestamp value, using 4 bits.

The timestamp command is therefore only required to be sent if the timestamp has changed compared with previous primitive in a bin. When the timestamp command is included, the values are thus sent as a delta from the previous primitive in the primitive list.

ii) Coverage (cvg8)

The coverage command (cvg8) encodes the tile coverage for the primitive (or set of primitives) associated with the command. The format of this command is set out below:

TABLE 6 coverage command format

| Field | Width |
| --- | --- |
| ID | 5 |
| Cvg | 3 |

The first field includes the opcode identifying that this is a coverage command. In this example, the opcode for the timestamp command is a 5-bit value. However, other arrangements would of course be possible.

The second field then includes the coverage mask. The coverage mask is used to indicate which quadrants of a tile are covered by the associated primitive (or set of primitives).

The coverage mask is therefore used if a primitive does not cover all four quadrants of a tile, such that the effective tile size is smaller than the bin size. Note that this command is therefore stateless, i.e. there is no dependency on the previous primitive. Thus, if a coverage command is not present in the sequence, that means that all four quadrants are covered. The coverage command can thus be included when there are deviations from this default.

iii) Variable Rate Shading (vrs8)

The variable rate shading (VRS) command (vrs8) encodes a per-primitive VRS rate, where variable rate shading is enabled. The value encoded here is an internal representation of the output of a combiner circuit located within the tiler pipeline that indicates the VRS rate to be used. The variable rate shading command is thus only sent if variable rate shading is enabled, and the rate changes compared with the previous primitive. The value that is sent is the new VRS rate.

TABLE 7 variable rate shading command format

| Field | Width |
| --- | --- |
| ID | 5 |
| vrs_int_rate | 3 | i) Scissor Index (sbid8)

The scissor index (sbid8) command relates to a scissor index, which is used to determine whether and/or how a scissor operation is to be performed for the primitive. The scissor index is only sent if scissor arrays are enabled and the number of scissors is more than one. If the scissor index command is not sent, the previous value is used. The value defaults to zero for each draw call.

TABLE 8 scissor index command format

| Field | Width |
|---|---|
| ID | 5 |
| sbid | 3 | i) Short Primitive Id (pid8)

The short primitive identifier (pid8) command is an 8-bit command that encodes the delta value of the primitive ID as compared with the previous primitive in a bin. When previous primitive ID in the primitive list is non-zero (and primitive ID is enabled), primitive ID is incremented by one by default, if this command (or the pid32 command) is not sent. Thus, if the previous primitive ID is zero, it will stay at zero unless this command (or pid32) is sent. The value that is sent is the delta primitive ID compared to the previous primitive ID in the primitive list.

TABLE 9 short primitive id command format

| Field | Width |
|---|---|
| ID | 5 |
| pid | 3 | i) Full Primitive id (pid32)

The full primitive identifier (pid32) command is a 32-bit command that encodes the full absolute value of the primitive ID. The full primitive identifier ('pid32') command can thus be used when the last value of primitive ID is not known, or it does not fit in a short primitive identifier ('pid8') command. The value that is sent is the current absolute primitive ID value.

TABLE 10 full primitive id command format

| Field | Width |
|---|---|
| ID | 8 |
| Cont | 1 |
| pid | 23 |

Again, it will be appreciated that these are merely some examples of types of state data commands that may be included into a primitive list according to the present embodiment. Other examples of state type commands that may or may not be used would of course be possible depending on the features and modes of the graphics processing system in question and which state data may therefore be desired to be indicated.

3. Configuration Commands

In the present embodiment, the primitive list format also includes two configuration commands, respectively 'cfg0' and 'cfg1', for storing configuration type data that applies to larger groups of plural primitives (e.g. a draw call, or plural draw calls). These commands are used to start respective configuration sequences. The formats of these commands are shown below.

i) cfg0 Command

The cfg0 command is a 32-bit command which starts a configuration sequence. It is followed by a configuration payload including the type or types configuration data specified by the cfg0 command. The format of the cfg0 command is set out below.

TABLE 11 cfg0 command format

| Field | Width |
|---|---|
| ID | 8 |
| Ts | 12 |
| Mask | 6 |
| Flags | 6 |

As above, the ID field stores the respective opcode identifying that the command is a cfg0 command. In this example, the cfg0 opcode ('op_9' in FIG. 4) is an 8-bit value. In that respect, it will be appreciated that cfg0 commands will be sent relatively less frequently, such that it may be better to allocate larger opcodes to this type of command (and reserve the smaller opcodes for commands that are likely to be included more frequently, such as those discussed above, to try to facilitate an overall use of shorter commands).

The timestamp ('ts') field encodes a delta or absolute timestamp value for the sequence of primitives to which the configuration command relates. The mask field then specifies what payload is defined for the configuration sequence. The flags field is used to specify extra properties of the configuration sequence as well as how the timestamp is processed.

The cfg0 mask is thus able to indicate a number of different types of configuration data, as shown below. When the cfg0 command is decoded, the mask is then iterated over starting from the lowest index to determine which types of configuration data are present in the payload following the configuration command. The payload is processed starting from the lowest index. All commands in the payload are 32 bits (for cfg0).

TABLE 12 cfg0 mask format

| Field | Width |
|---|---|
| enc_inst | 1 |
| enc_scissor | 1 |
| enc_depth_range | 1 |

As shown in Table 12, the cfg0 mask in this example has three bit values that can be used respectively for encoding three different types of configuration payload. For example, in the present embodiment, the first bit is used to encode an instance identification ('enc_inst') value. When the first bit is set, the cfg0 command is therefore followed by a 32-bit instance ID.

The second bit in the cfg0 mask can then be used to indicate whether a respective scissor value is encoded. The scissor value defines the size of a scissor box to be used when performing scissoring operations, where scissoring is enabled. When the second bit is set, the scissor box value is then included in the configuration payload following the cfg0 command. Thus, the second bit will only be set when scissoring operations are to be performed.

The third bit in the cfg0 mask is then used to indicate whether a depth clamp value is encoded into the configuration sequence.

It will be appreciated that other types of data may also suitably be encoded in this way. Indeed, a benefit of encoding the configuration data in this way is that additional types of configuration data can easily be encoded by including a suitable bit value to the mask.

The configuration flags for the cfg0 are set out below.

TABLE 13 cfg0 flags format

| Field | Width |
|---|---|
| ts_long | 1 |
| Sbid | 3 |

These flags can be used in a similar manner to the bitwise mask to manage the configuration data that is included into the primitive list in association with the cfg0 command. For example, when the long timestamp ('ts_long') flag is set, this indicates that more than 12 bits are needed to store the timestamp. In that case, the full (e.g. 32-bit) value of the timestamp may then be encoded into the primitive list following the cfg0 command, along with any other configuration payload that is indicated by the cfg0 command.

The scissor index ('sbid') flag is used only where a scissoring operation is performed (and if the bit 'enc_scissor' is set), to initialise the scissor index. Otherwise, this flag is set to zero.

i) cfg1 Command

Similarly to the cfg0 commands, the cfg1 command is another 32-bit command which can start a configuration sequence. It is followed by a payload including the configuration data specified by the cfg1 fields. Again, an 8-bit opcode is stored in the ID field, although other arrangements would be possible.

The cfg1 mask and flags are therefore able to encode different types of configuration data. In particular, for the cfg1 command, all of the commands in the payload are 64 bits, such that the cfg1 command can be used to store larger types of configuration data compared to the cfg0 command, e.g. as shown below.

TABLE 15 cfg1 mask format

| Field | Width |
|---|---|
| enc_dcd | 1 |
| enc_drawid | 1 |
| enc_query_occl | 1 |

TABLE 16 cfg1 flags format

| Field | Width |
|---|---|
| ts_long | 1 |
| dcd_mode | 2 |

The bits in the cfg1 mask are therefore used to encode the following types of configuration data.

enc_dcd—When this mask bit is set, the configuration command is followed by a pointer to the draw call descriptor, and other related fields. This can thus be included for the start of a new draw call.

enc_drawid—When this mask bit is set, the configuration command is followed by a draw call identifier (Draw ID).

enc_query_occl—Occlusion query pointer (query enabled). If occlusion queries are enabled, an occlusion query pointer can be sent. The occlusion query is used to determine whether a primitive is visible (and how far through the rendering pipeline it therefore needs to be processed).

ts_long—When this flag is set, this indicates that more than 12 bits of timestamp are needed.

dcd_mode—This flag indicates the rendering mode to be used for the draw call.

The benefit of these configuration type commands is thus that a single configuration type command (that can be identified using a single operation code (opcode)) can be used to identify multiple different types of configuration data or configuration metadata for inclusion into a configuration sequence within the primitive list. Thus, whilst some illustrative examples of the types of configuration data that can be indicated in this way are given above, various other types of configuration data can be included in a similar fashion.

A number of worked examples showing the overall preparation of a primitive list according to the above embodiment will now be discussed.

Example 1

In this example, there are three draw calls to be processed, each containing a number of triangular primitives, respectively:

Draw call A, DCD ptr=0xAA00, including triangles:
t0 (i0=0, i1=1, i2=2)
t1 (i0=3, i1=4, i2=5)
Draw call B, DCD ptr=0xBB00, including triangles:
t2 (i0=0, i1=1, i2=2)
t3 (i0=2, i1=1, i2=3)
Draw call C, DCD ptr=0xCC00, including triangles:
t4 (i0=0, i1=1, i2=2)
t5 (i0=4097, i1=4225, i2=3841)
t6 (i0=4095, i1=4096, i2=4094)

where i0 is vertex index 0, i1 is vertex index 1 and i2 is vertex index 2 for the respective primitives.

Figure 5:
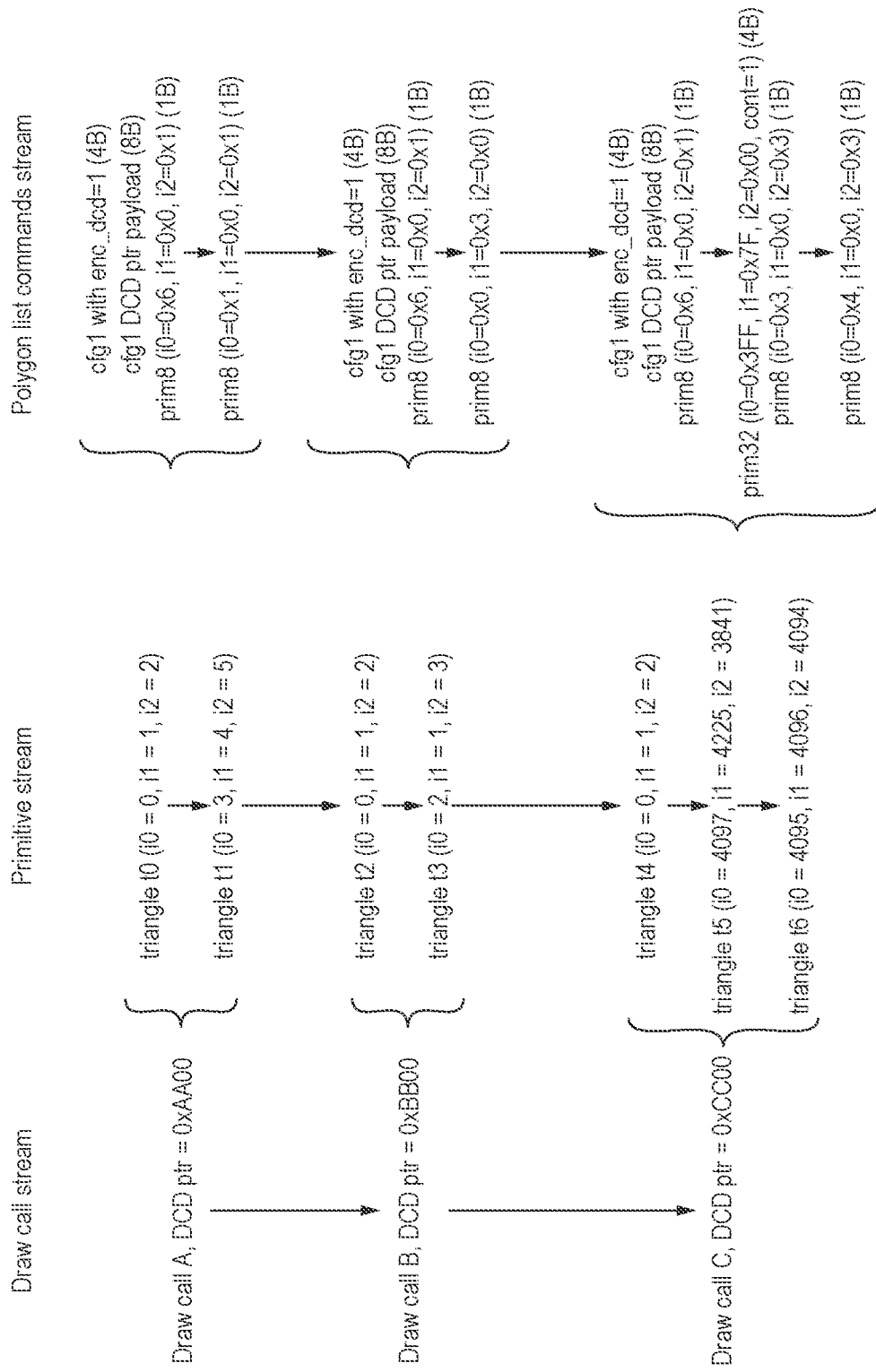
FIG. 5, FIG. 6 and FIG. 7 illustrate examples of primitive lists prepared according to the primitive list format of the technology described herein.

FIG. 5 illustrates the preparation of the primitive list according to Example 1. As shown in FIG. 5, the primitive list command sequence in Example 1 starts with a configuration sequence. In this example, the configuration sequence includes a cfg1 command with the 'enc_dcd' bit set to encode the draw call descriptor ('DCD ptr' payload). The draw call descriptor therefore follows the cfg1 command in the primitive list.

The primitives for the first draw call (draw call A) are then processed accordingly. During the primitive compression, the vertex index deltas are calculated in 32-bit range and negative values are represented as two's complement. For the first primitive in a draw call, the previous i0 is taken as zero. The compression algorithm described above is thus applied to each of the triangles defined for draw call A, as below.

For triangle t0:
The first vertex index delta (delta_i0) is first calculated with respect to the first vertex index for the previous primitive in the primitive list (last_i0):
    delta_i0=i0-last_i0=0x0 -0x0=0x0
    An offset of negative two is then applied to the delta value to give a reduced delta value (delta_i0_with_offset):
    delta_i0_with_offset=delta_i0-0x2=0xFFFFFFFE
    In this example, the reduced delta value (delta_i0_with_offset) for triangle t0 requires two bits. Therefore, it fits into the i0 field of a prim8 command.

The second vertex index delta (delta_i1) and the third vertex index delta (delta_i2) are then calculated with respect to the first vertex index (i0), with an offset of negative one selectively applied when the delta value is positive.

Thus, for the second vertex index delta (delta_i1):
    delta_i1=i1-i0=0x1-0x0=0x1
This is positive, so the offset is applied to give a reduced delta value (delta_i1_with_offset):
    delta_i1_with_offset=delta_i1-0x1=0x0
In this example, the reduced delta value (delta_i1_with_offset) for triangle t0 again requires two bits, and so can be fitted into the i1 field of a prim8 command.

Correspondingly, for the third vertex index delta (delta_i2):
    delta_i2=i2-i0=0x2 -0x0=0x2
    delta_i2_with_offset=delta_i2 -0x1=0x1
Again, this requires two bits, so fits into the i2 field of a prim8 command. As all of the vertex deltas fit into a prim8 command, the triangle t0 can thus be encoded as:
    prim8.i0=0x7 & delta_i0_with_offset=0x6
    prim8.i1=0x3 & delta_i1_with_offset=0x0
    prim8.i2=0x3 & delta_i2_with_offset=0x1
For triangle t1:
    delta_i0=i0-last_i0=0x3 -0x0=0x3
    delta_i0_with_offset=delta_i0 -0x2=0x1
    ##compressed i0 requires 2 bits i.e. it fits into prim8 cmd ##
    delta_i1=i1-i0=0x4 -0x3=0x1
    delta_i1_with_offset=delta_i1 -0x1=0x0
    ##compressed i1 requires 2 bits i.e. it fits into prim8 cmd ##
    delta_i2=i2-i0=0x5 -0x3=0x2
    delta_i2_with_offset=delta_i2 -0x1=0x1
    ##compressed i2 requires 2 bits i.e. it fits into prim8 cmd ##
    ###Largest delta of i0, i1 and i2 fits into prim8, so we encode it as:
    prim8.i0=0x7 & delta_i0_with_offset=0x1
    prim8.i1=0x3 & delta_i1_with_offset=0x0
    prim8.i2=0x3 & delta_i2_with_offset=0x1
For draw call A, both triangles are therefore compressible to prim8 commands. Two respective prim8 commands are therefore included into the primitive list following the configuration sequence for draw call A.

A new configuration sequence (cfg1 command) is then included to indicate the draw call descriptor for the next draw call (draw call B). The triangles defined for draw call B are then processed accordingly. For draw call B, both triangles are compressible to prim8 commands, but the index values are non-consecutive. For triangle t2 the values are exactly the same as for triangle t0.
For triangle t3:
    delta_i0=i0-last_i0=0x2 -0x0=0x2
    delta_i0_with_offset=delta_i0 -0x2=0x0
    ##compressed i0 requires 2 bits i.e. it fits into prim8 cmd ##
    delta_i1=i1-i0=0x1 -0x2=0xFFFFFFFF
    ##delta negative, do not subtract 1 ##
    delta_i1_with_offset=delta_i1=0xFFFFFFFF
    ##compressed i1 requires 2 bits i.e. it fits into prim8 cmd ##
    delta_i2=i2-i0=0x3 -0x2=0x1
    delta_i2_with_offset=delta_i2 -0x1=0x0
    ##compressed i2 requires 2 bits i.e. it fits into prim8 cmd ##
    ###Largest delta of i0, i1 and i2 fits into prim8, so we encode it as:
    prim8.i0=0x7 & delta_i0_with_offset=0x0
    prim8.i1=0x3 & delta_i1_with_offset=0x3
    prim8.i2=0x3 & delta_i2_with_offset=0x0
A further configuration sequence (cfg1 command) is then included to indicate the start of the next draw call (draw call C), and the triangles in that draw call processed appropriately. For draw call C, some triangles require more primitive commands. For triangle t4 the values are exactly the same as for triangle t0.
For triangle t5:
    delta_i0=i0-last_i0=0x1001 -0x0=0x1001
    delta_i0_with_offset=delta_i0 -0x2=0xFFF
    ##compressed i0 requires 13 bits i.e. it fits into prim8+prim32 cmds ##
    delta_i1=i1-i0=0x1081 -0x1001=0x80
    delta_i1_with_offset=delta_i1 -0x1=0x7F
    ##compressed i1 requires 8 bits i.e. it fits into prim8 cmd ##
    delta_i2=i2-i0=0xf01 -0x1001=0xFFFFFF00
    delta_i2_with_offset=delta_i2=0xFFFFFF00
    ##compressed i2 requires 9 bits i.e. it fits into prim8+prim32 cmds ##
    ###Largest delta of i0, i1 and i2 fits into prim8+prim32 cmd, so we encode it as:
    prim32.i0=0x3FF & delta_i0_with_offset=0x3FF
    prim32.i1=0xFF & delta_i1_with_offset=0x7F
    prim32.i2=0xFF & delta_i2_with_offset=0x0
    prim32.cont=0x1
    prim8.i0=0x7 & (delta_i0_with_offset>>10)=0x3
    prim8.i1=0x3 & (delta_i1_with_offset>>8)=0x0
    prim8.i2=0x3 & (delta_i2_with_offset>>8)=0x3
For triangle t6:
    delta_i0=i0-last_i0=0xFFF—0x1001=0xFFFFFFFE
    delta_i0_with_offset=delta_i0 -0x2=0xFFFFFFFC
    ##compressed i0 requires 3 bits i.e. it fits into prim8 cmd ##
    delta_i1=i1-i0=0x1000 -0xFFF=0x1
    delta_i1_with_offset=delta_i1 -0x1=0x0
    ##compressed i1 requires 2 bits i.e. it fits into prim8 cmd ##
    delta_i2=i2-i0=0xFFE-0xFFF=0xFFFFFFFF
    delta_i2_with_offset=delta_i2=0xFFFFFFFF
    ##compressed i2 requires 2 bits i.e. it fits into prim8 cmd ##
    ###Largest delta of i0, i1 and i2 fits into prim8, so we encode it as:
    prim8.i0=0x7 & delta_i0_with_offset=0x4
    prim8.i1=0x3 & delta_i1_with_offset=0x0
    prim8.i2=0x3 & delta_i2_with_offset=0x3
Thus, triangles t4 and t6 can be encoded using respective prim8 commands. However, for triangle t5, the vertex index deltas are too big to fit into a single primitive command, and so are encoded using the combination of primitive commands: prim8 prim32. This being the smallest available combination of primitive commands into which the vertex delta can be stored (i.e. using the fewest bits).

The overall primitive list command stream in this example thus appears as shown in FIG. 5.

Example 2

In Example 1 above, there is no state data encoded for any of the primitives (such that the default state values would be used for all of the primitives). Example 2 illustrates how state data is encoded into the primitive list command stream. In Example 2, there are two draw calls to be processed, each containing a number of triangular primitives, respectively:

Draw call A, DCD ptr=0xAA00, including triangles (with associated state data):
  t0 (i0=1, i1=1, i2=2) (vrs=1x1, sbid=0)
  t1 (i0=3, i1=4, i2=5) (vrs=2x1, sbid=0)
  t2 (i0=6, i1=7, i2=8) (vrs=4x2, sbid=1)
  t3 (i0=9, i1=10, i2=11) (vrs=4x2, sbid=2)
  t4 (i0=9, i1=10, i2=11) (vrs=4x2, sbid=2)

Draw call B, DCD ptr=0xBB00, including triangles (with associated state data):
  t5 (i0=0, i1=1, i2=2) (vrs=4x2, sbid=0)
  t6 (i0=3, i1=4, i2=5) (vrs=1x1, sbid=0)
  t7 (i0=6, i1=7, i2=8) (vrs=1x1, sbid=0)

Figure 6:
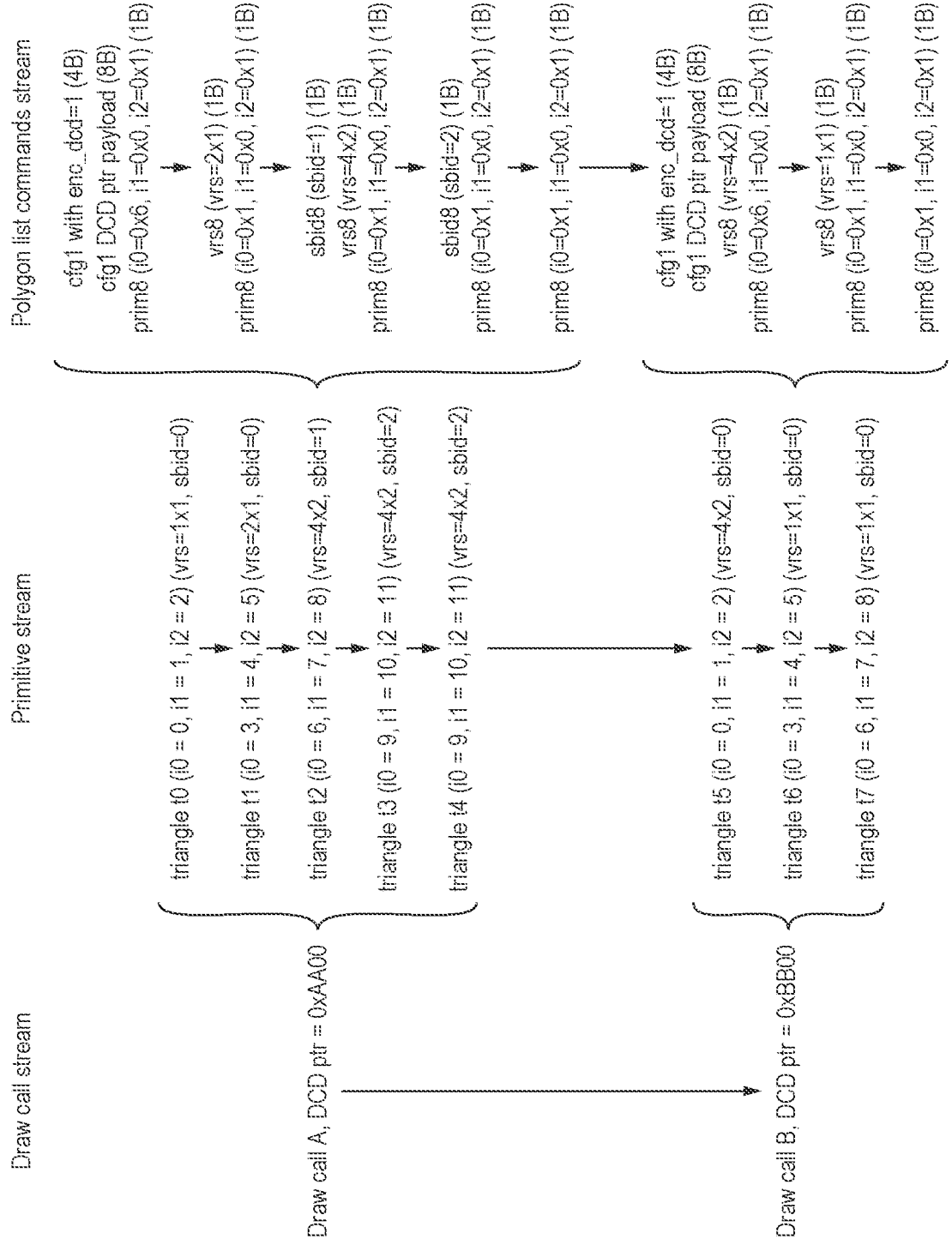

FIG. 6 illustrates the preparation of the primitive list according to Example 2. As shown in FIG. 6, the primitive list command sequence in Example 2 again starts with a configuration sequence identifying the first draw call (draw call A). In this example, the configuration sequence includes a cfg1 command with the 'enc_dcd' bit set to encode the draw call descriptor ('DCD ptr' payload). The draw call descriptor therefore follows the cfg1 command in the primitive list.

Primitive commands are then generated for the triangles within each draw call appropriately, e.g. in the same manner discussed above. However, in this example, it can be seen that the variable shading rate and scissor index changes between some of the primitives that are being processed for the respective draw calls. The default values are vrs=1x1 and sbid=0 which are used at the beginning of each draw call. However, as shown in FIG. 6, respective 'vrs8' and 'sbid8' state type commands are included into the primitive list to encode changes of state.

The overall primitive list thus appears as shown in FIG. 6 and includes a configuration sequence at the start of each draw call, and then respective 'vrs8' and 'sbid8' state type commands included ahead of respective primitive commands, as necessary, in order to encode the changes in the variable rate shading and scissor index.

Example 3

In Examples 1 and 2 above, the configuration commands are only used to identify the different draw calls, by including the DCD pointer as configuration payload following the respective configuration (cfg1) command. Example 3 illustrates how other configuration data can be encoded into the primitive list command stream. In Example 3 there are now three draw calls to be processed, each having a respective sequence of triangles, as follows:

Draw call A, DCD ptr=0xAA00, drawid=0, occl ptr=0, including triangles:
  t0 (i0=0, i1=1, i2=2)
  t1 (i0=3, i1=4, i2=5)

Draw call B, DCD ptr=0xBB00, drawid=5, occl_ptr=0xABC0, including triangles:
  t2 (i0=0, i1=1, i2=2)
  t3 (i0=3, i1=4, i2=5)

Draw call C, DCD ptr=0xCC00, drawid=0, occl_ptr=0xCDE0, including triangles:
  t4 (i0=0, i1=1, i2=2)
  t5 (i0=3, i1=4, i2=5)
  t6 (i0=6, i1=7, i2=8)

Figure 7:
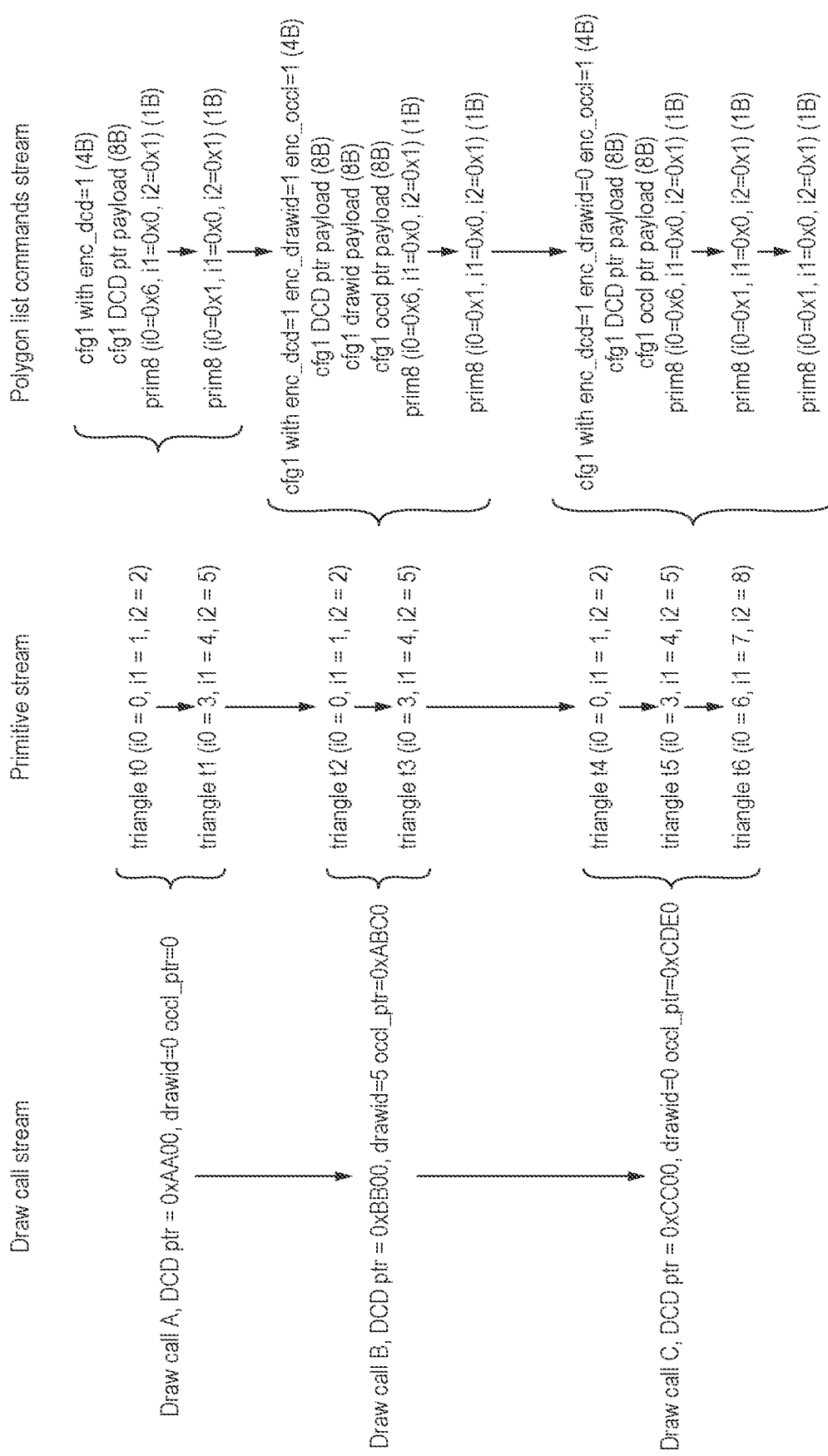

The preparation of the primitive list in Example 3 is illustrated in FIG. 7. As shown in FIG. 7, the respective configuration sequences at the start of each draw call now further indicate changes in configuration data, with the respective 'drawid' and 'occl ptr' configuration payloads following the 'DCD ptr' payload and cfg1 command for each draw call.

Figure 8:
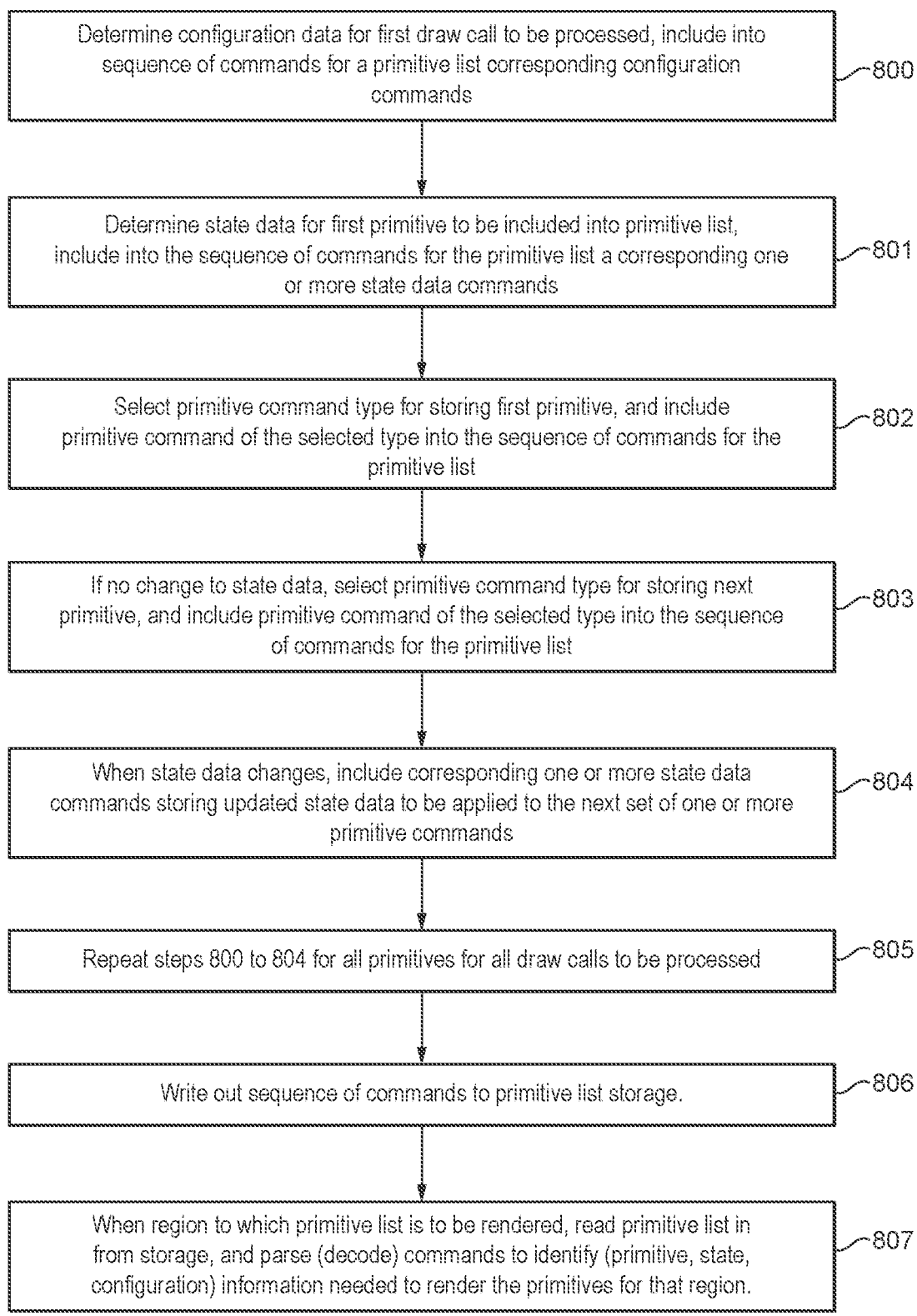
FIG. 8 is a flowchart illustrating a method an embodiment of the technology described herein.

FIG. 8 is a flow chart schematically illustrating the overall preparation of a primitive list an embodiment of the technology described herein.

As shown in FIG. 8, the preparation of a primitive list starts with a step of setting the configuration data for a first draw call to be processed, and including an appropriate sequence of configuration commands to indicate the configuration payload to be included (step 800).

The first primitive in the first draw call is then processed by first determining any (changes in) state data that is to be included in the primitive list in association with the first primitive, and generating corresponding state type commands, as needed (step 801) and then selecting an appropriate primitive command (or combination of primitive commands) for storing the compressed deltas for the vertex indices for that primitive (step 802).

The next primitive is then processed in the same way. However, if there is no change in state data that needs to be encoded for the next primitive (step 803), no state type commands need to be included for that primitive, and instead a suitable set of one or more primitive commands for storing the primitive data is generated and included into the primitive list sequence. On the other hand, if there is a change in state data that needs to be encoded, corresponding state data commands should be generated for inclusion into the primitive list ahead of the primitive command (step 804).

The above steps are then repeated (step 805) for all primitives in all draw calls to be processed in order to prepare the full primitive lists (for all regions for which primitive lists are being prepared). The resulting sequences of commands for the primitive lists are then written out to appropriate storage, e.g., in memory (step 806) for later use. Then, when it is desired to render a region for which a primitive list has been prepared, the associate primitive list (or lists) for that region is read back in from storage, and the sequence of commands is parsed (decoded) appropriately to identify the information needed to render the primitives for that region (step 807).

It will be appreciated from the above that the new primitive list format according to the technology described herein may provide various benefits compared to other approaches, in particular by allowing a more efficient and flexible approach for storing different types of data that may be desired to be stored within a primitive list.

In particular, the techniques described above facilitates the preparation of smaller primitive lists, which can thus be more efficiently stored and cached (e.g. in memory 23 and/or primitive list cache 30, as shown in FIG. 2).

The foregoing detailed description has been presented for the purposes of illustration and description. It is not intended to be exhaustive or to limit the technology described herein to the precise form disclosed. Many modifications and variations are possible in the light of the above teaching. The described embodiments were chosen in order to best explain the principles of the technology described herein and its practical applications, to thereby enable others skilled in the art to best utilise the technology described herein, in various embodiments and with various modifications as are suited to the particular use contemplated. It is intended that the scope be defined by the claims appended hereto.

The invention claimed is:

1. A method of processing data in a graphics processing system in which a render output is sub-divided into a plurality of tiles for rendering, the method comprising:
   determining which primitives in a sequence of primitives to be processed for the render output are to be rendered for respective regions into which the render output is sub-divided for sorting the primitives; and
   preparing corresponding primitive lists for the regions of the render output, each primitive list identifying a respective list of primitives that are to be rendered for the region of the render output to which the primitive list relates,
   wherein preparing a primitive list for a respective region of the render output comprises generating a sequence of primitive commands storing data identifying individual primitives that are to be rendered for the region of the render output to which the primitive list relates and storing the sequence of primitive commands in the primitive list,
   wherein there are a plurality of different primitive type commands available for storing the data identifying a primitive, the different primitive type commands having different respective sizes, and wherein when a new primitive is to be included into the primitive list, a corresponding set of one or more primitive commands selected from the plurality of available primitive type commands is generated for storing the data identifying the primitive.

2. The method of claim 1, wherein data identifying a single primitive can be stored using a combination of two or more primitive type commands, wherein the available combinations of different primitive type commands that can be used to store data identifying a single primitive is restricted to a subset of all of the possible combinations of primitive type commands.

3. The method of claim 1, wherein the primitive type commands each comprise a first portion storing an operation code identifying that the command is a primitive type command storing data relating to an individual primitive to be rendered and a second portion storing data identifying a set of vertex indices for the primitive to which the primitive command relates, wherein the vertex indices are stored in a compressed form.

4. The method of claim 3, wherein the first vertex index in the set of vertex indices for the primitive to which the current primitive command relates is stored as a difference value encoding the difference to the first vertex index for the primitive identified by the previous primitive command in the primitive list.

5. The method of claim 4, wherein a negative offset is applied to the difference value for the first vertex index to reduce the difference value, with the reduced value for the first vertex index being stored in the second portion of the primitive command.

6. The method of claim 5, wherein the second or further vertex indices in the set of vertex indices for the primitive to which the current primitive command relates are stored as differences to the first vertex index for the current primitive.

7. The method of claim 6, wherein when storing the second or further index differences, a negative offset is selectively applied, such that when the difference value is positive, a negative offset of one is applied, whereas when the difference value is negative, zero offset is applied.

8. The method of claim 1, wherein there are a plurality of different state type commands that are configured for storing different respective state data, and wherein a state type command is included into the sequence of commands in association with the current primitive command only when there is a change in the respective state data that needs to be indicated for the primitive identified by the current primitive command.

9. The method of claim 1, wherein a configuration type command is able to indicate which types of configuration data from a respective set of one or more different types of configuration data should be included into the primitive list, wherein a configuration type command when generated for inclusion into a primitive list includes an indicator indicating which type or types of the set of different types of configuration data that can be indicated by the configuration type command are included into the primitive list in association with the configuration command, and wherein the configuration command is followed in the sequence of commands generated for the primitive list by a corresponding set of configuration data including configuration data of the type or types indicated by the indicator.

10. The method of claim 1, wherein there is a set of plural different primitive type commands available for storing the data identifying a primitive, the different primitive type commands having different respective sizes, wherein the data identifying a single primitive can be stored either using a single one of the primitive type commands from the set of plural different primitive type commands or using a combination of two or more primitive type commands from the set of plural different primitive type commands, and wherein when a new primitive is to be included into the primitive list, a corresponding set of one or more primitive commands selected from the set of plural different primitive type commands is generated for storing the data identifying the primitive.

11. A graphics processing system in which a render output is sub-divided into a plurality of tiles for rendering, the graphics processing system comprising:
   a tiling circuit that is operable to perform tiling operations comprising determining which primitives in a sequence of primitives to be processed for a render output are to be rendered for respective regions into which the render output is sub-divided for sorting the primitives; and
   a primitive list preparation circuit that is configured to prepare corresponding primitive lists for respective regions of the render output, each primitive list identifying a respective list of primitives that are to be rendered for the region of the render output to which the primitive list relates,
   wherein preparing a primitive list for a respective region of the render output comprises the primitive list preparation circuit generating a sequence of primitive commands storing data identifying individual primitives that are to be rendered for the region of the render output to which the primitive list relates and storing the sequence of primitive commands in the primitive list,
   wherein there are a plurality of different primitive type commands having different sizes available for storing the data identifying the primitive, and wherein when a new primitive is to be included into the primitive list, a corresponding set of one or more primitive commands selected from the plurality of available primitive type commands is generated for storing the data identifying the primitive.

12. The graphics processing system of claim 11, wherein data identifying a single primitive can be stored using a combination of two or more primitive type commands, wherein the available combinations of different primitive type commands that can be used to store data identifying a single primitive is restricted to a subset of all of the possible combinations of primitive type commands.

13. The graphics processing system of claim 11, wherein the primitive type commands each comprise a first portion storing an operation code identifying that command is a primitive type command storing data relating to an individual primitive to be rendered and a second portion storing data identifying a set of vertex indices for the primitive to which the primitive command relates, wherein the vertex indices are stored in a compressed form.

14. The graphics processing system of claim 13, wherein the first vertex index in the set of vertex indices for the primitive to which the current primitive command relates is stored as a difference value encoding the difference to the first vertex index for the primitive identified by the previous primitive command in the primitive list.

15. The graphics processing system of claim 14, wherein a negative offset is applied to the difference value for the first vertex index to reduce the difference value, with the reduced value for the first vertex index being stored in the second portion of the primitive command.

16. The graphics processing system of claim 14, wherein the second or further vertex indices in the set of vertex indices for the primitive to which the current primitive command relates are stored as differences to the first vertex index for the current primitive.

17. The graphics processing system of claim 16, wherein when storing the second or further index differences, a negative offset is selectively applied, such that when the difference value is positive, a negative offset of one is applied, whereas when the difference value is negative, zero offset is applied.

18. The graphics processing system of claim 11, wherein there is a set of plural different primitive type commands having different sizes available for storing the data identifying the primitive, wherein the data identifying a single primitive can be stored either using a single one of the primitive type commands from the set of plural different primitive type commands or using a combination of two or more primitive type commands from the set of plural different primitive type commands, and wherein when a new primitive is to be included into the primitive list, a corresponding set of one or more primitive commands selected from the set of plural different primitive type commands is generated for storing the data identifying the primitive.

19. A method of encoding primitive data for use by graphics processor, the method comprising:
generating a sequence of primitive commands storing data identifying individual primitives that are to be processed,
wherein there is a set of plural different primitive type commands available for storing the data identifying a primitive, the different primitive type commands having different respective sizes, wherein the data identifying a single primitive can be stored either using a single one of the primitive type commands from the set of plural different primitive type commands or using a combination of two or more primitive type commands from the set of plural different primitive type commands, and wherein when a new primitive is to be encoded, a corresponding set of one or more primitive commands selected from the available primitive type commands is generated for storing the data identifying the primitive.

20. The method of claim 19, wherein the primitive type commands each comprise a first portion storing an operation code identifying that the command is primitive type command storing data relating to an individual primitive to be rendered and a second portion storing data identifying a set of vertex indices for the primitive to which the primitive command relates, wherein the vertex indices are stored in a compressed form in which the first vertex index in the set of vertex indices for the primitive to which the current primitive command relates is stored as a difference value encoding the difference to the first vertex index for the primitive identified by the previous primitive command.

* * * * *